(12) United States Patent
Saneto et al.

(10) Patent No.: US 9,733,512 B2
(45) Date of Patent: Aug. 15, 2017

(54) LIQUID CRYSTAL DISPLAY DEVICE

(71) Applicant: FUJIFILM Corporation, Tokyo (JP)

(72) Inventors: Ryuji Saneto, Kanagawa (JP); Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 14 days.

(21) Appl. No.: 15/015,652

(22) Filed: Feb. 4, 2016

(65) Prior Publication Data

US 2016/0154275 A1   Jun. 2, 2016

Related U.S. Application Data

(63) Continuation of application No. PCT/JP2014/070588, filed on Aug. 5, 2014.

(30) Foreign Application Priority Data

Aug. 12, 2013 (JP) .................................. 2013-167917

(51) Int. Cl.
*G02F 1/1335* (2006.01)
*G02B 5/26* (2006.01)
*G02B 5/30* (2006.01)

(52) U.S. Cl.
CPC ......... *G02F 1/133553* (2013.01); *G02B 5/26* (2013.01); *G02B 5/3025* (2013.01);
(Continued)

(58) Field of Classification Search
CPC ............. G02F 1/133617; G02F 1/1335; G02F 1/133524; G02F 1/133514;
(Continued)

(56) References Cited

U.S. PATENT DOCUMENTS

| 8,882,299 B2 | 11/2014 | Kinomoto et al. |
| 9,110,203 B2 | 8/2015 | Seo et al. |

(Continued)

FOREIGN PATENT DOCUMENTS

| JP | H01-133003 A | 5/1989 |
| JP | 2000-047184 A | 2/2000 |

(Continued)

OTHER PUBLICATIONS

International Search Report issued in connection with International Patent Application No. PCT/JP2014/070588 on Oct. 28, 2014.

(Continued)

*Primary Examiner* — Thoi Duong
(74) *Attorney, Agent, or Firm* — Edwards Neils LLC; Jean C. Edwards, Esq.

(57) ABSTRACT

A liquid crystal display device, in which a backlight unit, a light conversion member, a selective reflection member, a liquid crystal cell, and a display-side polarizer are disposed in this order, the backlight unit includes a light source that emits unpolarized light having a light emission central wavelength in a wavelength range of 300 nm to lower than 430 nm, the selective reflection member reflects 60% to 100% of the unpolarized light entering the selective reflection member and transmits at least some of light in a wavelength of higher than 430 nm to 650 nm, and the light conversion member includes an aligned fluorescent material that emits blue, green and red light which are linearly polarized in a vibration direction parallel to an absorption axis of the display-side polarizer, is improved in terms of the front surface luminance.

15 Claims, 3 Drawing Sheets

(52) U.S. Cl.
CPC .... G02F 1/13362 (2013.01); G02F 1/133528 (2013.01); G02F 1/133536 (2013.01); G02F 1/133605 (2013.01); *G02F 2001/133614* (2013.01)

(58) Field of Classification Search
CPC ......... G02F 1/133533; G02F 1/133536; G02F 1/13362; G02F 1/133621; G02F 1/133528; G02F 1/133555; G02F 1/133603; G02F 1/133615; G02F 1/133605; G02F 1/133553; G02F 2001/133614; G02F 2001/133638; G02F 2001/133541; G02F 2202/046; F21V 13/14; F21V 13/08; F21V 9/10; C12Q 2561/119; G02B 5/26; G02B 5/30; G02B 5/3025
USPC ..... 362/84, 19, 328, 343, 97.1; 345/102, 46; 349/71, 114, 61, 62, 65, 96, 70, 98, 113, 349/115
See application file for complete search history.

(56) References Cited

U.S. PATENT DOCUMENTS

| | | | |
|---|---|---|---|
| 2010/0214657 | A1 | 8/2010 | Kuroda et al. |
| 2011/0216271 | A1* | 9/2011 | Suzuki ................ G02F 1/13362 349/71 |
| 2012/0206935 | A1 | 8/2012 | Seo et al. |
| 2012/0320607 | A1 | 12/2012 | Kinomoto et al. |

FOREIGN PATENT DOCUMENTS

| | | |
|---|---|---|
| JP | 2001-026456 A | 1/2001 |
| JP | 2001-264756 A | 9/2001 |
| JP | 2001-318370 A | 11/2001 |
| JP | 3448626 B2 | 9/2003 |
| JP | 3704364 B2 | 10/2005 |
| JP | 2010-204622 A | 9/2010 |
| JP | 2010-221685 A | 10/2010 |
| JP | 2011-202148 A | 10/2011 |
| JP | 2012-502322 A | 1/2012 |
| JP | 2012-022028 A | 2/2012 |
| JP | 2012-169271 A | 9/2012 |
| WO | 93/15906 A2 | 8/1993 |
| WO | 93/15906 A3 | 8/1993 |
| WO | 95/17699 A1 | 6/1995 |
| WO | 2010/028728 A1 | 3/2010 |
| WO | 2012/059931 A1 | 5/2012 |

OTHER PUBLICATIONS

Written Opinion issued in connection with International Patent Application No. PCT/JP2014/070588 on Oct. 28, 2014.

Jian Chen et al.; A High-Efficiency Wide-Color-Gamut Solid-State Backlight System for LCDs Using Quantum Dot Enhancement Film; SID 2012 Digest; Jun. 2012; pp. 895-896; vol. 43, Issue 1; Society for Information Display; U.S.

Notification of Reason for Refusal issued by the Korean Intellectual Property Office on Dec. 8, 2016, in connection with Korean Patent Application No. 10-2016-7003099.

Notification of Reasons for Refusal issued by the Japanese Patent Office on Aug. 2, 2016, in connection with Japanese Patent Application No. 2013-167917.

International Preliminary Report on Patentability issued by WIPO on Feb. 16, 2016 in connection with International Patent Application No. PCT/JP2014/070588.

* cited by examiner

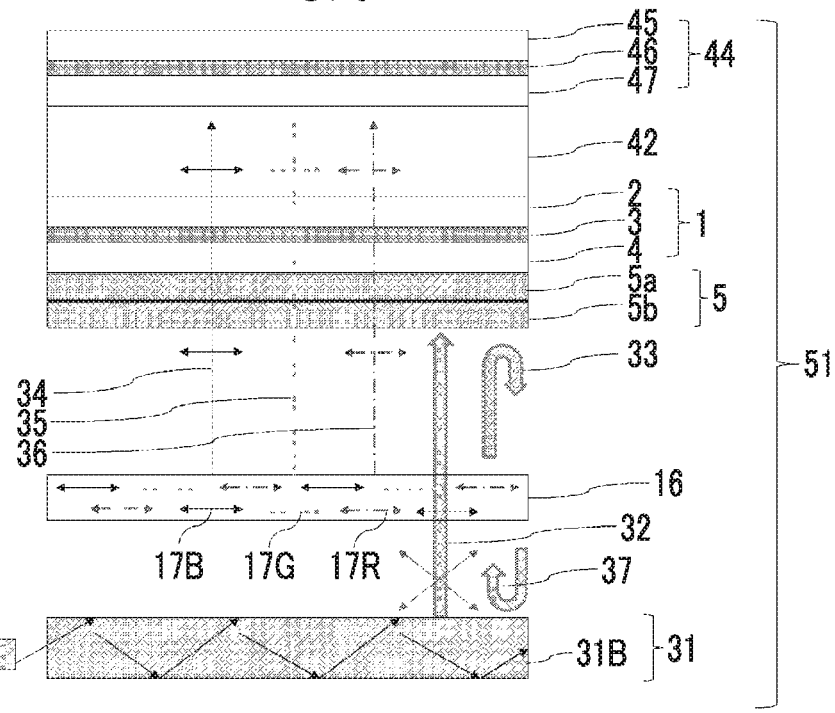
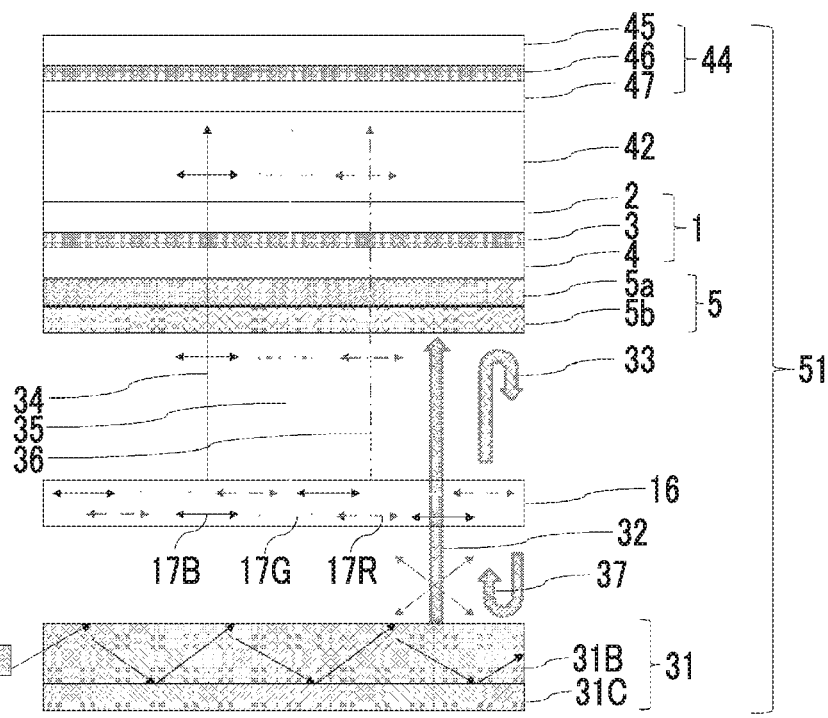

LIQUID CRYSTAL DISPLAY DEVICE

CROSS-REFERENCE TO RELATED APPLICATIONS

This application is a Continuation of PCT International Application No. PCT/JP2014/070588, filed on Aug. 5, 2014, which was published under PCT Article 21(2) in Japanese, and claims priority under 35 U.S.C. Section 119(a) to Japanese Patent Application No. 2013-167917 filed on Aug. 12, 2013. The above applications are hereby expressly incorporated by reference, in their entirety, into the present application.

BACKGROUND OF THE INVENTION

1. Field of the Invention

The present invention relates to a liquid crystal display device and, specifically, to a liquid crystal display device having improved front surface luminance.

2. Description of the Related Art

A liquid crystal display device (hereinafter, also referred to as LCD) has been used in a broadening range of fields every year as an image display device which has low power consumption and saves spaces. A liquid crystal display device has a constitution in which a backlight (hereinafter, also referred to as BL), a backlight-side polarizing plate, a liquid crystal cell, a display-side polarizing plate, and the like are provided in this order.

Recently, for liquid crystal display devices, development for power saving, high definition, and color reproducibility improvement has been underway in order to improve LCD performance. At the moment, while there is a significant demand for power saving, high definition, and color reproducibility improvement particularly in small-sized display devices such as table PCs and smartphones, development of next-generation Hi-visions (4K2K, EBU ratio of 100% or higher) with current TV standards (FHD, 72% of National Television System Committee (NTSC) ratio≈100% of European Broadcasting Union (EBU) ratio) is also underway for large-sized display devices. Therefore, there is an intensifying demand for power saving, high definition, and color reproducibility improvement in liquid crystal display devices.

In accordance with power saving in the backlight, there are cases in which an optical sheet member is provided between the backlight and the backlight-side polarizing plate in order to increase light utilization efficiency. The optical sheet member is an optical element that, out of incidence light rays vibrating in random directions, transmits only light rays vibrating in a specific polarization direction and reflects light rays vibrating in other polarization directions. As a core member of a low-power LCD developed in response to an increasing number of mobile devices and a decrease in power consumption of home appliance, it is expected to increase luminance (the degree of brightness of a light source per unit area) by solving the low light utilization efficiency of LCDs.

As the above-described optical sheet member, a technique is known in which a specific optical sheet member (Dual Brightness Enhancement Film (DBEF) or the like) is provided between the backlight and the backlight-side polarizing plate so as to improve the light utilization efficiency of the BL by means of light recycling and thus the luminance of the BL is improved while saving power in the backlight (refer to JP3448626B). Similarly, JP1989-133003A (JP-H1-133003A) describes a polarizing plate obtained by laminating a λ/4 plate and a cholesteric liquid crystalline phase. It is possible to improve the light utilization efficiency of the BL by means of light recycling by broadening the bandwidths in a layer formed by fixing three or more layers of a cholesteric liquid crystalline phase having different pitches between the cholesteric liquid crystalline phases.

However, the above-described optical sheet member has a complicated member constitution, and thus, in order to distribute the optical sheet member in the market, it becomes essential to reduce the cost by decreasing the number of members by means of additional integration of functions of the members.

Meanwhile, from the viewpoint of high definition and color reproducibility improvement of a liquid crystal display device, a method for sharpening the light emission spectrum of the backlight is also known. For example, JP2012-169271A describes a method for increasing luminance and improving color reproducibility by realizing white light using a quantum dot (QD) which emits red light and green light as a fluorescent body between a blue LED and a light guide plate. In SID'12 DIGEST p. 895, a method of combining a light conversion sheet (QDEF, also referred to as quantum dot sheet) in which a quantum dot is used in order to improve the color reproducibility of the LCD is proposed.

In addition, in JP2012-22028A, a method is proposed in which a fluorescent body layer including a fluorescent body made up of quantum dots is disposed in a path for light radiated by a violet LED or a blue LED, thereby decreasing the energy loss in a color filter and increasing the energy efficiency of a liquid crystal display.

Meanwhile, in JP2012-502322A, a liquid crystal display device is proposed in which a blue light source, a cholesteric liquid crystal, a light conversion layer capable of altering the wavelength of light to a longer value, and a λ/4 plate are combined together, thereby providing clearly visible bright images under a bright ambient light condition with a low power consumption and improving long-term reliability.

SUMMARY OF THE INVENTION

Since the constitutions of JP3448626B and JP1989-133003A (JP-H1-133003A) for improving the light utilization efficiency have a multilayer constitution and a complicated structure in consideration of the wavelength dispersibility of the members in order to impart a broadband light recycling function to white light, there is a problem of high manufacturing costs. In addition, the fluorescent light (PL) application techniques described in JP2012-169271A, JP2012-22028A, and SID'12 DIGEST p. 895 are techniques for realizing high luminance and color reproducibility improvement using a quantum dot (hereinafter, also referred to as QD); however, for additional improvement of the luminance, a combination of JP3448626B and JP1989-133003A (JP-H1-133003A) thereinto is essential, and thus there is the same problem as in JP3448626B and JP1989-133003A (JP-H1-133003A). JP2012-502322A describes a light conversion member that emits polarized light by being combined with a cholesteric liquid crystal or a λ/4 plate, but improvement in the utilization efficiency of light that excites fluorescent light emission is not mainly described, and there is still a problem in luminance improvement.

An object of the present invention to be achieved is to provide a liquid crystal display device having a new member constitution which is capable of improving front surface luminance including improvement in the light utilization ratio of BL, which is required for power saving. In addition, another object of the present invention is to reduce costs by decreasing the number of members by means of additional integration of the functions of members.

That is, an object of the present invention to be achieved is to provide a liquid crystal display device having improved front surface luminance.

The present inventors carried out intensive studies in order to achieve the above-described objects and consequently found that, when a selective reflection member capable of reflecting a majority of light from a backlight in a part of an ultraviolet light to blue light range using a backlight of ultraviolet light to blue light having a short wavelength and of transmitting visible light and a light conversion member including an aligned fluorescent material (organic, inorganic, a quantum dot, or the like) that emits blue, green, and red linearly polarized light when ultraviolet light to blue light having a short wavelength enters the aligned fluorescent material are combined together, front surface luminance can be improved by increasing a light utilization ratio, and the above-described objects can be achieved.

That is, the above-described objects are achieved using the present invention having the following constitutions.

[1] A liquid crystal display device including a backlight unit, a light conversion member, a selective reflection member, a liquid crystal cell, and a display-side polarizer disposed in this order, in which the backlight unit includes a light source that emits unpolarized light having a light emission central wavelength in a wavelength range of 300 nm to lower than 430 nm, the selective reflection member reflects 60% to 100% of the unpolarized light entering the selective reflection member and transmits at least some of light in a wavelength of higher than 430 nm to 650 nm, and the light conversion member includes an aligned fluorescent material that, due to the unpolarized light entering the light conversion member, emits blue light which has a light emission central wavelength in a wavelength range of 430 nm to 480 nm and is light linearly polarized in a vibration direction parallel to an absorption axis of the display-side polarizer, green light which has a light emission central wavelength in a wavelength range of 500 nm to 600 nm and is light linearly polarized in the vibration direction parallel to the absorption axis of the display-side polarizer, and red light which has a light emission central wavelength in a wavelength range of 600 nm to 650 nm and is light linearly polarized in the vibration direction parallel to the absorption axis of the display-side polarizer.

[2] The liquid crystal display device according to [1], in which, preferably, the unpolarized light is made up of light in a first polarization state and light in a second polarization state, the selective reflection member sequentially includes a first selective reflection region and a second selective reflection region from a backlight side, the first selective reflection region reflects the light in the first polarization state out of the unpolarized light entering the first selective reflection region, transmits the light in the second polarization state while maintaining the polarization state, and transmits light in a wavelength range of higher than 430 nm to 650 nm, and the second selective reflection region reflects the light in the second polarization state which passes through the first selective reflection region and enters the second selective reflection region and transmits light in a wavelength range of higher than 430 nm to 650 nm.

[3] The liquid crystal display device according to [1] or [2], in which, preferably, the selective reflection member sequentially includes a first dielectric multilayer film and a second dielectric multilayer film, the first dielectric multilayer film has a reflection central wavelength in a wavelength range of 300 nm to 430 nm, reflects light linearly polarized in a first direction at the reflection central wavelength, transmits light linearly polarized in a second direction orthogonal to the first direction, and transmits at least some of the light in a wavelength range of higher than 430 nm to 650 nm, and the second dielectric multilayer film has a reflection central wavelength in a wavelength range of 300 nm to 430 nm, reflects light linearly polarized in a second direction at the reflection central wavelength, and transmits at least some of the light in a wavelength range of higher than 430 nm to 650 nm.

[4] The liquid crystal display device according to [1] or [2], in which, preferably, the selective reflection member sequentially includes a light reflection layer formed by fixing a first cholesteric liquid crystalline phase and a light reflection layer formed by fixing a second cholesteric liquid crystalline phase, the light reflection layer formed by fixing the first cholesteric liquid crystalline phase has a reflection central wavelength in a wavelength range of 300 nm to 430 nm, reflects any one of right-circularly-polarized light and left-circularly-polarized light at the reflection central wavelength, transmits the other light, and transmits at least some of the light in a wavelength range of higher than 430 nm to 650 nm, and the light reflection layer formed by fixing the second cholesteric liquid crystalline phase has a reflection central wavelength in a wavelength range of 300 nm to 430 nm, reflects circularly polarized light in a direction different from that of the light reflection layer formed by fixing the first cholesteric liquid crystalline phase at the reflection central wavelength, and transmits at least some of the light in a wavelength range of higher than 430 nm to 650 nm.

[5] The liquid crystal display device according to any one of [1] to [4], preferably further including a backlight-side polarizer between the selective reflection member and the liquid crystal cell, in which the backlight-side polarizer and the absorption axis of the display-side polarizer are orthogonal to each other.

[6] The liquid crystal display device according to [5], preferably further including two polarizing plate protective films on both surfaces of the backlight-side polarizer, in which, out of the two polarizing plate protective films, at least the polarizing plate protective film on a selective reflection member side is a cellulose acylate film.

[7] The liquid crystal display device according to any one of [1] to [6], in which the fluorescent material preferably includes at least a quantum dot.

[8] The liquid crystal display device according to [7], in which the quantum dot is preferably a quantum dot having an ellipsoidal shape or a rectangular parallelepiped shape.

[9] The liquid crystal display device according to [8], in which a long axis direction of the quantum dot is preferably aligned in a direction parallel to the absorption axis of the display-side polarizer.

[10] The liquid crystal display device according to any one of [1] to [9], in which the light conversion member is preferably an aligned fluorescent sheet formed by dispersing and then stretching the fluorescent material.

[11] The liquid crystal display device according to any one of [1] to [10], in which the blue light, the green light, and the red light emitted from the light conversion member all preferably have a peak with a light emission intensity having a half bandwidth of 100 nm or smaller.

[12] The liquid crystal display device according to any one of [1] to [11], in which the entire backlight unit is preferably a surface light source.

[13] The liquid crystal display device according to any one of [1] to [12], in which the light emission central wavelength of the unpolarized light emitted from the backlight unit is preferably in a wavelength range of 300 nm to 380 nm.

[14] The liquid crystal display device according to any one of [1] to [13], in which the unpolarized light emitted from the backlight unit preferably has a peak with a light emission intensity having a half bandwidth of 30 nm or smaller.

[15] The liquid crystal display device according to any one of [1] to [14], in which the backlight unit preferably includes a reflection member capable of reflecting light in some or all of a wavelength range of 300 nm to 430 nm.

According to the present invention, it is possible to provide a liquid crystal display device having improved front surface luminance.

BRIEF DESCRIPTION OF THE DRAWINGS

FIG. 3 is a schematic view illustrating a section of still another example of the liquid-crystal display device of the present invention in which a backlight-side polarizer is provided, and the selective reflection member is in contact with the backlight-side polarizer.

FIG. 4 is a schematic view illustrating a section of still another example of the liquid-crystal display device of the present invention in which a backlight unit further includes a reflection member in FIG. 3.

DESCRIPTION OF THE PREFERRED EMBODIMENTS

Figure 1:
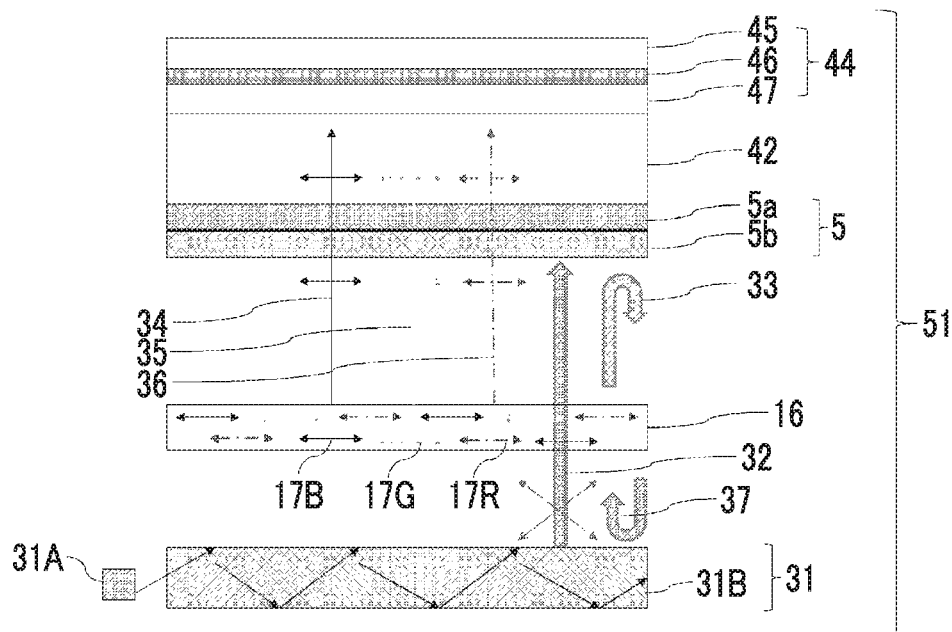
FIG. 1 is a schematic view illustrating a section of an example of a liquid crystal display device of the present invention.

Hereinafter, a liquid crystal display device of the present invention will be described in detail.

Constitution requirements described below will be, in some cases, described based on a typical embodiment of the present invention, but the present invention is not limited to the above-described embodiment. Meanwhile, in the present specification, numerical ranges expressed using "to" include numerical values before and after the "to" as the lower limit value and the upper limit value.

In the present specification, the "half bandwidth" of a peak refers to the width of the peak at the half of the peak height. Unpolarized light refers to light not having polarization characteristics.

[Liquid Crystal Display Device]

In a liquid crystal display device of the present invention, a backlight unit, a light conversion member, a selective reflection member, a liquid crystal cell, and a display-side polarizer are disposed in this order;

the backlight unit includes a light source that emits unpolarized light having a light emission central wavelength in a wavelength range of 300 nm to lower than 430 nm;

the selective reflection member reflects 60% to 100% of the unpolarized light entering the selective reflection member and transmits at least some of the light in a wavelength of higher than 430 nm to 650 nm; and the light conversion member includes an aligned fluorescent material that, due to the unpolarized light entering the light conversion member, emits blue light which has a light emission central wavelength in a wavelength range of 430 nm to 480 nm and is light linearly polarized in a vibration direction parallel to an absorption axis of the display-side polarizer, green light which has a light emission central wavelength in a wavelength range of 500 nm to 600 nm and is light linearly polarized in the vibration direction parallel to the absorption axis of the display-side polarizer, and red light which has a light emission central wavelength in a wavelength range of 600 nm to 650 nm and is light linearly polarized in the vibration direction parallel to the absorption axis of the display-side polarizer.

The above-described constitution improves the front surface luminance of the liquid crystal display device of the present invention and enables a decrease in the total thickness of members by means of a decrease in the number of the members. Since the selective reflection member capable of reflecting a majority of light from the backlight in a part of an ultraviolet light to blue light range and of transmitting visible light and the light conversion member including the aligned fluorescent material (organic, inorganic, a quantum dot, or the like) that emits blue, green, and red linearly polarized light when ultraviolet light to blue light having a short wavelength enters the aligned fluorescent material are used in a combined form, absorption of light from the backlight in the backlight rather than in the liquid crystal cell is suppressed, and it is possible to increase the light utilization ratio.

In addition, since the transmission axis of the display-side polarizer is parallel to the vibration directions of the blue light, the green light, and the red light, it is possible to cause all of the blue light, the green light, and the red light to enter the liquid crystal cell in similar polarization states even without the backlight-side polarizing plate.

First, the constitution of the liquid crystal display device of the present invention will be described using the accompanying drawings.

FIGS. 1 to 5 illustrate schematic views of the liquid crystal display device of the present invention.

A liquid crystal display device 51 of the present invention illustrated in FIG. 1 includes a backlight unit 31, a light conversion member 16, a selective reflection member 5, a liquid crystal cell 42, and a display-side polarizing plate 44.

The backlight unit 31 includes a light source 31A that emits unpolarized light having a light emission central wavelength in a wavelength range of 300 nm to lower than 430 nm. The backlight unit 31 preferably includes a light guide plate 31B which serves as a surface light source, a reflection member 31C (FIGS. 4 and 5) capable of reflecting light in some or all of a wavelength range of 300 nm to 430 nm, and the like.

The selective reflection member 5 is capable of selectively reflecting 60% to 100% of unpolarized light 32 entering the selective reflection member 5 and of transmitting at least some of the light in a wavelength of higher than 430 nm to 650 nm (for example, at least some (preferably all) of blue light 34 emitted from the light conversion member, at least some (preferably all) of green light 35 emitted from the light conversion member, and at least some (preferably all) of red light 36 emitted from the light conversion member).

Figure 2:
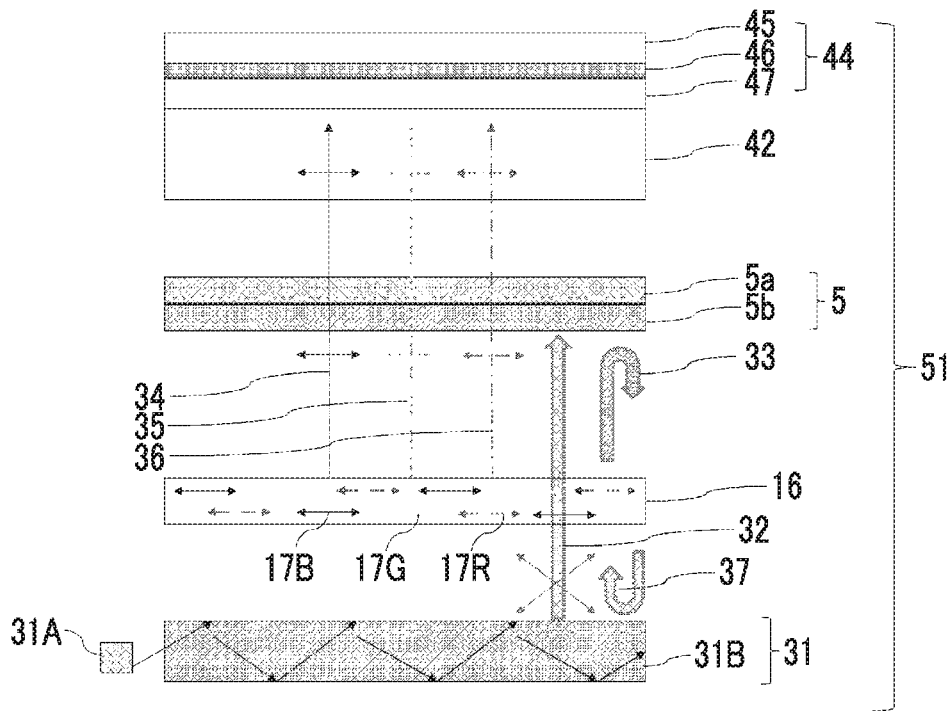
FIG. 2 is a schematic view illustrating a section of another example of the liquid crystal display device of the present invention in which a selective reflection member is not in contact with a liquid crystal cell.

The liquid crystal display device of the present invention may have a constitution in which neither a backlight-side polarizer 3 described below nor a backlight-side polarizing plate 1 described below are provided as illustrated in FIG. 1 or 2. In this case, a liquid crystal cell 42 may be in direct contact with the selective reflection member 5 as illustrated in FIG. 1 or the liquid crystal cell may be laminated on the selective reflection member through an adhesive layer, not illustrated. Alternatively, the liquid crystal cell 42 may be disposed so as to be separate from the selective reflection member 5 (through an air layer) as illustrated in FIG. 2.

As a specific constitution of the selective reflection member 5, a constitution in which a first selective reflection region 5a and a second selective reflection region 5b are sequentially provided from the backlight side as illustrated in FIGS. 1 to 5 is preferred. As the first selective reflection region 5a, it is possible to use a light reflection layer formed by fixing a dielectric multilayer film or a cholesteric liquid crystalline phase. As the second selective reflection region 5b, it is possible to use another dielectric multilayer film capable of reflecting light linearly polarized in a direction orthogonal to the linear polarization direction of light reflected by the dielectric multilayer film used as the first selective reflection region 5a or a light reflection layer formed by fixing a cholesteric liquid crystalline phase which is capable of reflecting light circularly polarized in a direction opposite to the circular polarization direction of light reflected by a light reflection layer formed by fixing a cholesteric liquid crystalline phase used as the first selective reflection region 5a. However, the constitution of the selective reflection member 5 is not limited to the constitutions illustrated in FIGS. 1 to 5.

First, in the constitution of the selective reflection member 5 in which the first dielectric multilayer film which is the first selective reflection region 5a and the second dielectric multilayer film which is the second selective reflection region 5a are provided in this order, when the unpolarized light 32 entering the selective reflection member 5 passes through the first selective reflection region 5a, light linearly polarized in the first direction is reflected at the reflection central wavelength, and light linearly polarized in the second direction orthogonal to the first direction passes through the first selective reflection region 5a. The light linearly polarized in the second direction which has passed through the first selective reflection region 5a is reflected by the second selective reflection region 5b. The light linearly polarized in the first direction reflected by the first dielectric multilayer film which is the first selective reflection region 5a and the light linearly polarized in the second direction reflected by the second dielectric multilayer film which is the second selective reflection region 5b travels toward the light conversion member 16 or the backlight unit 31.

Figure 5:
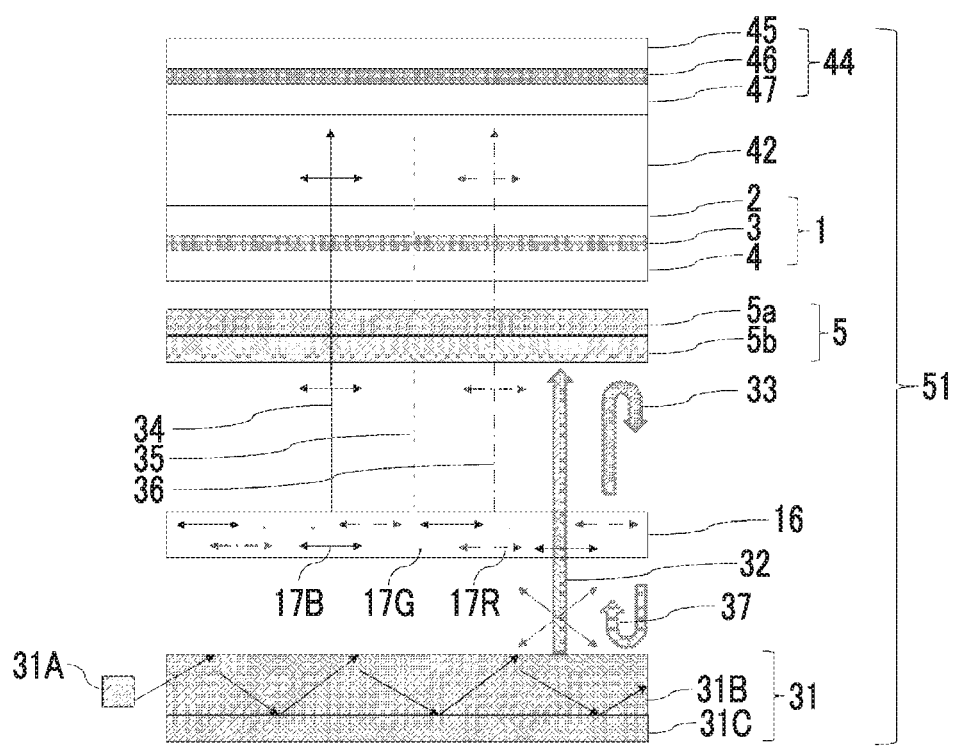
FIG. 5 is a schematic view illustrating a section of still another example of the liquid-crystal display device of the present invention in which the backlight-side polarizer is provided, and the selective reflection member is not in contact with the backlight-side polarizer.

Light 33 which has been reflected by the selective reflection member and has reached the backlight unit 31, that is, the light linearly polarized in the first direction and the light linearly polarized in the second direction, which falls in a wavelength range of 300 nm to lower than 430 nm, is reflected or scattered by an arbitrary member constituting the backlight unit 31, for example, the interface of the light guide plate 31B or the arbitrarily provided reflection member 31C illustrated in FIG. 4 or 5 and travels toward the light conversion member 16 or the selective reflection member 5 as retroreflective light 37 in a wavelength range of 300 nm to lower than 430 nm.

Meanwhile, the first dielectric multilayer film which is the first selective reflection region 5a transmits at least some of the light in a wavelength range of higher than 430 nm to 650 nm, specifically, some or all of linearly polarized blue light 34, green light 35, and red light 36 emitted from a light conversion member described below, and thus the linearly polarized blue light 34, green light 35, and red light 36 emitted from the light conversion member which have passed through the first dielectric multilayer film which is the first selective reflection region 5a travel toward the second selective reflection region 5b. The second dielectric multilayer film which is the second selective reflection region 5b also transmits at least some of the light in a wavelength range of higher than 430 nm to 650 nm, specifically, some or all of the linearly polarized blue light 34, green light 35, and red light 36 emitted from the light conversion member described below, and thus the linearly polarized blue light 34, green light 35, and red light 36 emitted from the light conversion member which have entered the second dielectric multilayer film which is the second selective reflection region 5b also pass through the second selective reflection region 5b and travel toward the liquid crystal cell 42 or the arbitrarily provided backlight-side polarizer 1.

Next, in the constitution of the selective reflection member 5 in which the light reflection layer formed by fixing a first cholesteric liquid crystalline phase which is the first selective reflection region 5a and the light reflection layer formed by fixing a second cholesteric liquid crystalline phase which is the second selective reflection region 5a are provided in this order, when the unpolarized light 32 entering the selective reflection member 5 passes through the first selective reflection region 5a, one of right-circularly-polarized light and left-circularly-polarized light is reflected at the reflection central wavelength, and the other is transmitted. Light circularly polarized in a direction different from the reflection direction by the light reflection layer formed by fixing a first cholesteric liquid crystalline phase, which has passed through the first selective reflection region 5a, is reflected by the second selective reflection region 5b. One of right-circularly-polarized light and left-circularly-polarized light reflected by the light reflection layer formed by fixing the first cholesteric liquid crystalline phase which is the first selective reflection region 5a and light circularly polarized in another direction which is reflected by the light reflection layer formed by fixing the second cholesteric liquid crystalline phase which is the second selective reflection region 5b travels toward the light conversion member 16 or the backlight unit 31.

Light 33 which has been reflected by the selective reflection member and has reached the backlight unit 31, that is, the right-circularly-polarized light and left-circularly-polarized light in a wavelength range of 300 nm to lower than 430 nm is reflected or scattered by an arbitrary member constituting the backlight unit 31, for example, the interface of the light guide plate 31B or the arbitrarily provided reflection member 31C illustrated in FIG. 4 or 5 and travels toward the light conversion member 16 or the selective reflection member 5 as retroreflective light 37 in a wavelength range of 300 nm to lower than 430 nm.

Meanwhile, the light reflection layer formed by fixing the first cholesteric liquid crystalline phase which is the first selective reflection region 5a collectively transmits at least some of the light in a wavelength range of higher than 430 nm to 650 nm, specifically, some or all of linearly polarized blue light 34, green light 35, and red light 36 emitted from the light conversion member described below, and thus the linearly polarized blue light 34, green light 35, and red light 36 emitted from the light conversion member which have passed through the light reflection layer formed by fixing the first cholesteric liquid crystalline phase which is the first selective reflection region 5a travel toward the second selective reflection region 5b. The light reflection layer formed by fixing the second cholesteric liquid crystalline phase which is the second selective reflection region 5b also transmits at least some of the light in a wavelength range of higher than 430 nm to 650 nm, specifically, some or all of the linearly polarized blue light 34, green light 35, and red light 36 emitted from the light conversion member described below, and thus the linearly polarized blue light 34, green light 35, and red light 36 emitted from the light conversion member which have entered the light reflection layer formed by fixing the second cholesteric liquid crystalline phase which is the second selective reflection region 5b also pass through the second selective reflection region 5b and travel toward the liquid crystal cell 42 or the arbitrarily provided backlight-side polarizer 1.

The light conversion member 16 includes aligned fluorescent materials 17B, 17G, and 17R that, due to unpolarized light entering the light conversion member 16, emits the blue light 34 which has a light emission central wavelength in a wavelength range of 430 nm to 480 nm and is light linearly polarized in a vibration direction parallel to an absorption axis of the display-side polarizer; the green light 35 which has a light emission central wavelength in a wavelength range of 500 nm to 600 nm and is light linearly polarized in the vibration direction parallel to the absorption axis of the display-side polarizer; and the red light 36 which has a light emission central wavelength in a wavelength range of 600 nm to 650 nm and is light linearly polarized in the vibration direction parallel to the absorption axis of the display-side polarizer.

That is, the vibration directions of the blue light 34, the green light 35, and the red light 36 are identical to each other.

Examples of the unpolarized light entering the light conversion member 16 include the unpolarized light 32 having a light emission central wavelength in a wavelength region of 300 nm to lower than 430 nm which is emitted from the backlight unit; the light 33 reflected by the selective reflection member which has a light emission central wavelength in a wavelength region of 300 nm to lower than 430 nm; and the light 37 retroreflected by an arbitrary member constituting the backlight unit 31 which has a light emission central wavelength in a wavelength region of 300 nm to lower than 430 nm.

The backlight-side polarizer 3 illustrated in FIGS. 3 to 5 which may be arbitrarily provided is preferably disposed so that the transmission axis (not illustrated) of the backlight-side polarizer 3 becomes parallel to the vibration direction of the blue light 34, the green light 35, and the red light 36. In addition, it is preferable that the backlight-side polarizer 3 is orthogonal to the absorption axis of the display-side polarizer 46, that is, the backlight-side polarizer 3 is orthogonal to the transmission axis of the display-side polarizer 46.

The backlight-side polarizer 3 having a polarizing plate protective film laminated and disposed on at least any one of the surfaces thereof is called a backlight-side polarizing plate 1. The constitution of the backlight-side polarizing plate is not particularly limited, a well-known constitution can be employed, and it is possible to employ a constitution of a laminate including a polarizing plate protective film (inner side) 2, the polarizer 3, and a polarizing plate protective film (outer side) 4. In addition, it is also possible to employ, for example, an inner component-free constitution in which the polarizing plate protective film is not provided on the inner side and an adhesive or a coated film is directly provided on the polarizer.

Furthermore, as the polarizing plate protective film on the outer side or instead of the polarizing plate protective film 4 on the outer side, the selective reflection member 5 can be used. That is, it is possible to use the selective reflection member 5 as the polarization plate protective film 4 on the outer side which is included in the backlight-side polarizing plate.

In the liquid crystal display device 51 of the present invention, the selective reflection member 5 and the backlight-side polarizer 3 may be disposed adjacent to each other directly or through an adhesive, not illustrated, or the polarizing plate protective film 4 on the outer side (refer to FIGS. 3 and 4) or may be disposed separate from each other through an air layer (refer to FIG. 5). In the liquid crystal display device 51 of the present invention, the selective reflection member 5 and the backlight-side polarizer 1 are preferably disposed adjacent to each other through the polarizing plate protective film 4 on the outer side since it becomes easy to accurately control the optical performance of the selective reflection member 5, and the luminance is further improved by improving the light utilization efficiency of the unpolarized light 32 having a light emission central wavelength in a wavelength range of 300 nm to lower than 430 nm which is emitted from the backlight unit or the light 37 retroreflected by an arbitrary member constituting the backlight unit 31 which has a light emission central wavelength in a wavelength range of 300 nm to lower than 430 nm or light leakage of ultraviolet light or blue light having a short wavelength is suppressed.

The display-side polarizer 46 illustrated in FIGS. 1 to 5 is disposed so that the absorption axis of the display-side polarizer 46 is parallel to the vibration direction of the blue light 34, the green light 35, and the red light 36.

The display-side polarizing plate 44 including the display-side polarizer 46 is not particularly limited, a well-known constitution can be employed, and it is possible to use, for example, a constitution of a laminate of the polarizing plate protective film (outer side) 45, the display-side polarizer 46, and the polarizing plate protective film (inner side) 47 as illustrated in FIGS. 1 to 5.

In the liquid crystal display device 51 of the present invention, a luminance-improving film, not illustrated, may be further disposed between the light conversion member 16 and the selective reflection member 5, and examples of the luminance-improving film include a well-known prism sheet and a diffusion plate. However, in the liquid crystal display device 51 of the present invention, the disposition position of the luminance-improving film is not limited, and the luminance-improving film may be disposed between the light conversion member 16 and the backlight unit 31.

Next, regarding the respective members constituting the liquid crystal display device of the present invention, a preferred aspect will be described.

<Backlight Unit>

In the liquid crystal display device of the present invention, the backlight unit includes a light source that emits unpolarized light having a light emission central wavelength in a wavelength range of 300 nm to lower than 430 nm.

A backlight may be either an edge light mode having a light guide plate, a reflection plate, or the like as a constitutional member or a direct backlight mode; however, in the liquid crystal display device of the present invention, the entire backlight unit is preferably a surface light source. In a case in which the backlight unit is a light source or an edge light mode, the liquid crystal display device of the present invention preferably includes a reflection member that reflects (repeatedly reflects) light which has been emitted from the light source and reflected by the selective reflection member in the rear portion of the light guide plate. The reflection member needs to be capable of improving the brightness of the liquid crystal display device and needs to randomize the polarization state and the direction of light which is emitted from the light source and is reflected by the selective reflection member and recirculate the light. The above-described reflection member is not particularly limited, and a well-known reflection member can be used. The reflection member is described in JP3416302B, JP3363565B, JP4091978B, JP3448626B, and the like, the contents of which are incorporated into the present invention.

In the liquid crystal display device of the present invention, the light source in the backlight unit is preferably an UV light-emitting diode or a blue light-emitting diode which emits light having a light emission central wavelength in a wavelength range of 300 nm to lower than 430 nm and more preferably an UV light-emitting diode.

The backlight unit preferably includes, additionally, a well-known diffusion plate, a well-known diffusion sheet, and a well-known prism sheet (for example, BEF or the like). These additional members are also described in JP3416302B, JP3363565B, JP4091978B, JP3448626B, and the like, the contents of which are incorporated into the present invention.

In the liquid crystal display device of the present invention, the light emission central wavelength of unpolarized light emitted from the backlight unit (ultraviolet light, violet light, or blue light having a short wavelength) is preferably in a wavelength range of 300 nm to 380 nm and more preferably in a wavelength range of 350 nm to 380 nm.

In the liquid crystal display device of the present invention, the unpolarized light emitted from the backlight unit preferably has a peak with a light emission intensity having a half bandwidth of 100 nm or smaller, more preferably has a peak with a light emission intensity having a half bandwidth of 80 nm or smaller, particularly preferably has a peak with a light emission intensity having a half bandwidth of 70 nm or smaller, more particularly preferably has a peak with a light emission intensity having a half bandwidth of 30 nm or smaller, and still more particularly preferably has a peak with a light emission intensity having a half bandwidth of 10 nm or smaller.

In the liquid crystal display device of the present invention, the light emission central wavelength of the unpolarized light emitted from the backlight unit preferably coincides with the reflection central wavelength of the selective reflection member. Specifically, the light emission central wavelength of the unpolarized light emitted from the backlight unit preferably coincides with the reflection central wavelength of the first selective reduction region and the second selective reduction region in the selective reflection member. More specifically, the light emission central wavelength of the unpolarized light emitted from the backlight unit preferably coincides with the reflection central wavelength of the first dielectric multilayer film used as the first selective reduction region and the reflection central wavelength of the second dielectric multilayer film used as the second selective reduction region in the selective reflection member. Alternatively, the light emission central wavelength of the unpolarized light emitted from the backlight unit preferably coincides with the reflection central wavelength of the light reflection layer formed by fixing the first cholesteric liquid crystalline phase which is used as the first selective reduction region and the reflection central wavelength of the light reflection layer formed by fixing the second cholesteric liquid crystalline phase which is used as the second selective reduction region in the selective reflection member. In the present specification, two wavelengths "coinciding with each other" means not only a case in which two wavelengths completely coincide with each other but also a case in which two wavelengths differ from each other within an optically acceptable range. The difference between the light emission central wavelength of the unpolarized blue light emitted from the backlight unit and the reflection central wavelength of the selective reflection member is preferably 50 nm or smaller, more preferably 20 nm or smaller, and particularly preferably 10 nm or smaller. In addition, in the present specification, the light emission central wavelength refers to a wavelength at which the peak of the spectrum of the light emission intensity reaches the maximum value. In addition, in the present specification, the reflection central wavelength refers to a wavelength at which the peak of the spectrum of the reflection ratio reaches the maximum value.

<Light Conversion Member>

The liquid crystal display device of the present invention includes a light conversion member and includes an aligned fluorescent material that, due to the unpolarized light entering the light conversion member, emits blue light which has a light emission central wavelength in a wavelength range of 430 nm to 480 nm and is light linearly polarized in the vibration direction parallel to the absorption axis of the display-side polarizer; green light which has a light emission central wavelength in a wavelength range of 500 nm to 600 nm and is light linearly polarized in the vibration direction parallel to the absorption axis of the display-side polarizer; and red light which has a light emission central wavelength in a wavelength range of 600 nm to 650 nm and is light linearly polarized in the vibration direction parallel to the absorption axis of the display-side polarizer.

In the liquid crystal display device of the present invention, in order for the light conversion member to emit linearly polarized light, the light conversion member includes an aligned fluorescent material, that is, the liquid crystal display device is formed by aligning the light conversion member. The polarization state of light emitted from the light conversion member can be measured by measuring polarized light using, for example, an Axoscan manufactured by Axometrics, Inc.

In the liquid crystal display device of the present invention, all of the blue light, the green light, and the red light emitted from the light conversion member preferably have a peak with a light emission intensity having a half bandwidth of 100 nm or smaller, more preferably have a peak with a light emission intensity having a half bandwidth of 80 nm or smaller, and particularly preferably have a peak with a light emission intensity having a half bandwidth of 70 nm or smaller.

Examples of an inorganic fluorescent material include yttrium.aluminum.carbonate-based yellow fluorescent bodies, terbium.aluminum.carbonate-based yellow fluorescent bodies, and the like. The fluorescent wavelength of the fluorescent material can be controlled by changing the particle diameter of the fluorescent body. Additionally, the fluorescent material described in JP2010-532005A can be used.

In addition, an organic fluorescent material can also be used, and, for example, the fluorescent materials described in JP2001-174636A, JP2001-174809A, and the like can be used.

The light conversion member including an organic or inorganic fluorescent material, for example, a dye or a pigment is preferably a sheet in which the above-described fluorescent material is aligned, a thermoplastic film formed by dispersing and then stretching the above-described fluorescent material, or an adhesive layer in which the above-described fluorescent material is dispersed and oriented.

In the liquid crystal display device of the present invention, the quantum dot included in the light conversion member is preferably a quantum rod formed by aligning ellipsoid-shape or rectangular parallelepiped-shape particles.

The above-described ellipsoid-shape or rectangular parallelepiped-shape quantum rod is not particularly limited, the ellipsoid-shape or rectangular parallelepiped-shape quantum rod described in U.S. Pat. No. 7,303,628A, a dissertation (Peng, X. GC; Manna, L.; Yang, W. D.; Wickham, j.; Scher, E.; Kadavanich, A.; Alivisatos, A. P. Nature 2000, 404, 59 to 61), and a dissertation (Manna, L.; Scher, E. C.; Alivisatos, A. P. j. Am. Chem. Soc. 2000, 122, 12700 to 12706), and the like can be used, and the contents thereof are incorporated into the present invention. The method for observing the shape of the quantum rod is not particularly limited, and the shape of the quantum rod can be observed using a transmission electron microscope.

In the liquid crystal display device of the present invention, the long axis direction of the quantum rod is preferably aligned in a direction parallel to the transmission axis the backlight-side polarizer since it is possible to emit light linearly polarized in a desired predetermined vibration direction (a direction parallel to the absorption axis of the display-side polarizer and preferably a direction parallel to the transmission axis of the backlight-side polarizer) irrespective of the vibration direction of linearly polarized light of incidence light on the light conversion member. A method for confirming the long axis direction of the quantum rod is not particularly limited, and the long axis direction can be confirmed using a transmission electron microscope.

A method for aligning the long axis direction of the quantum rod in a direction parallel to the absorption axis of the display-side polarizer or in a direction parallel to the transmission axis of the backlight-side polarizer is not particularly limited, and examples thereof include the following method.

As the light conversion member including the fluorescent material, a thermoplastic film obtained by being stretched after the quantum rod material is dispersed can be used. The above-described thermoplastic film is not particularly limited, and a well-known thermoplastic film can be used. The thermoplastic film is described in, for example, JP2001-174636A, JP2001-174809A, and the like, the contents of which are incorporated into the present invention.

According to the liquid crystal display device of the present invention, even when the amount of the fluorescent material in the light conversion member is small, it is possible to sufficiently improve the front surface luminance. A preferred range of the content of the fluorescent material in the light conversion member varies depending on the kind of the fluorescent material; however, for example, when the content thereof is set as described below, the amount of the fluorescent material used is decreased, and thus the manufacturing costs can be reduced, which is preferable. On the other hand, when the content thereof is too small, the light emission intensity in the plane of the light conversion member becomes uneven, which is not preferable.

In a case in which the fluorescent material is a quantum rod, the content of the fluorescent material in the light conversion member is preferably the following content.

The mass of the quantum rod per unit area is preferably in a range of 0.000001 $g/m^2$ to 2 $g/m^2$, more preferably in a range of 0.000005 $g/m^2$ to 0.02 $g/m^2$, and most preferably in a range of 0.00001 $g/m^2$ to 0.01 $g/m^2$.

<Selective Reflection Member>

In the liquid crystal display device of the present invention, the selective reflection member reflects 60% to 100% of the unpolarized light entering the selective reflection member and transmits at least some of the light in a wavelength of higher than 430 nm to 650 nm. That is, it is preferable that the selective reflection member selectively exhibits a reflection function with respect to unpolarized light which is emitted from the backlight unit and has a light emission central wavelength in a wavelength range of 300 nm to lower than 430 nm or light retroreflected by the backlight unit and does not exhibit a reflection function with respect to at least some of the light in a wavelength range of higher than 430 nm to 650 nm.

Reflection of 60% or more of unpolarized light in a wavelength range of 300 nm to lower than 430 nm which enters the selective reflection member cannot be achieved using only one kind of well-known dielectric multilayer film (trade name DBEF, manufactured by 3M Japan Limited) or using only one kind of light reflection layer formed by fixing a cholesteric liquid crystal. The dielectric multilayer film or the light reflection layer formed by fixing a cholesteric liquid crystal is not capable of reflecting only one component of a P wave and an S wave of linearly polarized light or one component of right-circularly-polarized light and left-circularly-polarized light, and the reflection ratio reaches 50% at most even when only one kind of dielectric multilayer film or light reflection layer is used.

The percentage of the unpolarized light in a wavelength range of 300 nm to lower than 430 nm which enters the selective reflection member reflected by the selective reflection member is preferably 80% to 100%, more preferably reflects 90% to 100%, particularly preferably 95% to 100%, and more particularly preferably reflects 99% to 100%.

The selective reflection member has a reflection central wavelength in a wavelength range of 300 nm to 430 nm, and the reflection central wavelength is preferably in a wavelength range of 300 nm to 380 nm and more preferably in a wavelength range of 350 nm to 380 nm.

The peak of the reflection ratio having a reflection central wavelength in a wavelength range of 300 nm to 430 nm is preferably a peak of the reflection ratio having a half bandwidth of 100 nm or smaller, more preferably a peak of the reflection ratio having a half bandwidth of 80 nm or smaller, particularly preferably a peak of the reflection ratio having a half bandwidth of 70 nm or smaller, more particularly preferably a peak of the reflection ratio having a half bandwidth of 20 nm or smaller, and still more particularly preferably a peak of the reflection ratio having a half bandwidth of 10 nm or smaller.

The selective reflection member transmitting at least some of the light in a wavelength range of higher than 430 nm to 650 nm is not limited to an aspect in which the transmission ratio is 100% in the entire wavelength range of higher than 430 nm to 650 nm, and the transmission ratio may be high enough to be optically accepted in the liquid crystal display device at a desired wavelength in a wavelength range of higher than 430 nm to 650 nm. For example, the selective reflection member preferably does not have any peaks of the reflection ratio in the visible light range other than the peak of the reflection ratio in a wavelength range of 300 nm to lower than 430 nm.

Specifically, the selective reflection member preferably transmits at least some of blue light which is emitted from the light conversion member, has a light emission central wavelength in a wavelength range of 430 nm to 480 nm, and is light linearly polarized in the vibration direction parallel to the absorption axis of the display-side polarizer, more preferably transmits light having the light emission central wavelength of the blue light, and particularly preferably transmits all of the light emission peaks of the blue light. In the selective reflection member, the peak of the maximum reflection ratio in a wavelength range of 430 nm to 480 nm is preferably 20% or lower, the peak of the maximum reflection ratio in a wavelength range of 430 nm to 480 nm is more preferably 10% or lower, and the peak of the maximum reflection ratio in a wavelength range of 430 nm to 480 nm is particularly preferably 5% or lower.

In addition, the selective reflection member preferably transmits at least some of green light which is emitted from the light conversion member, has a light emission central wavelength in a wavelength range of 500 nm to 600 nm, and is light linearly polarized in the vibration direction parallel to the absorption axis of the display-side polarizer, more preferably transmits light having the light emission central wavelength of the green light, and particularly preferably transmits all of the light emission peaks of the green light. In the selective reflection member, the peak of the maximum reflection ratio in a wavelength range of 500 nm to 600 nm is preferably 20% or lower, the peak of the maximum reflection ratio in a wavelength range of 500 nm to 600 nm is more preferably 10% or lower, and the peak of the maximum reflection ratio in a wavelength range of 500 nm to 600 nm is particularly preferably 5% or lower.

The selective reflection member preferably transmits at least some of red light which is emitted from the light conversion member, has a light emission central wavelength in a wavelength range of 600 nm to 650 nm, and is light linearly polarized in the vibration direction parallel to the absorption axis of the display-side polarizer, more preferably transmits light having the light emission central wavelength of the green light, and particularly preferably transmits all of the light emission peaks of the green light. In the selective reflection member, the peak of the maximum reflection ratio in a wavelength range of 600 nm to 650 nm is preferably 20% or lower, the peak of the maximum reflection ratio in a wavelength range of 600 nm to 650 nm is more preferably 10% or lower, and the peak of the maximum reflection ratio in a wavelength range of 600 nm to 650 nm is particularly preferably 5% or lower.

In the selective reflection member, the polarization state of light in a wavelength range of higher than 430 nm to 650 nm which enters the selective reflection member and the polarization state of light in a wavelength range of higher than 430 nm to 650 nm which is emitted from the selective reflection member are preferably substantially identical to each other, and specifically, the vibration direction of linearly polarized light in a wavelength range of higher than 430 nm to 650 nm which enters the selective reflection member and the vibration direction of linearly polarized light in a wavelength range of higher than 430 nm to 650 nm which is emitted from the selective reflection member are preferably parallel to each other. However, when the polarization states of light entering the selective reflection member and light emitted from the selective reflection member become substantially identical to each other, the polarization state of the light in a wavelength range of higher than 430 nm to 650 nm which enters the selective reflection member may change while the light passes through the selective reflection member, and light may be transmitted through, for example, two λ/4 plates in which the slow axes are orthogonal to each other in the selective reflection member.

The total film thickness of the selective reflection member is preferably in a range of 1 μm to 130 μm, more preferably in a range of 1 μm to 70 μm, particularly preferably in a range of 1 μm to 10 μm, and more particularly preferably in a range of 1 μm to 8 μm.

(Dielectric Multilayer Film)

In an aspect (i) of the liquid crystal display device of the present invention, it is preferable that the selective reflection member sequentially includes a first dielectric multilayer film and a second dielectric multilayer film, the first dielectric multilayer film has a reflection central wavelength in a wavelength range of 300 nm to 430 nm, reflects light linearly polarized in a first direction at the reflection central wavelength, transmits light linearly polarized in a second direction orthogonal to the first direction, and transmits at least some of the light in a wavelength range of higher than 430 nm to 650 nm, and the second dielectric multilayer film has a reflection central wavelength in a wavelength range of 300 nm to 430 nm, reflects light linearly polarized in a second direction at the reflection central wavelength, and transmits at least some of the light in a wavelength range of higher than 430 nm to 650 nm.

With respect to unpolarized light in a wavelength range of 300 nm to 430 nm which enters the dielectric multilayer film, the dielectric multilayer film used in the aspect (i) reflects or transmits (emits) linearly polarized light. A case in which one flat peak of the reflection ratio appears at an almost constant wavelength in the entire wavelength range of 300 nm to 430 nm is also included in the scope of the aspect (i).

Meanwhile, in FIGS. 1 to 5, the first selective reflection region 5a or the second selective reflection region 5b is drawn as a single layer for the convenience of drawing the drawings, but the dielectric multilayer film used in the present invention is not limited by the above-described specific example, and the number of the dielectric multilayer films laminated can be appropriately changed in order to achieve the target reflection ratio or reflection central wavelength.

The combination of the first dielectric multilayer film which has a reflection central wavelength in a wavelength range of 300 nm to 430 nm, reflects light linearly polarized in a first direction at the reflection central wavelength, and transmits light linearly polarized in a second direction orthogonal to the first direction and the second dielectric multilayer film which has a reflection central wavelength in a wavelength range of 300 nm to 430 nm and reflects light linearly polarized in the second direction at the reflection central wavelength is not particularly limited. For example, it is possible to laminate the same dielectric multilayer film as the first dielectric multilayer film in a state of being rotated at 90° with respect to the first dielectric multilayer film and use the dielectric multilayer film as the second dielectric multilayer film.

The dielectric multilayer film preferably has a thin film thickness. The total film thickness of all of the dielectric multilayer films including the first dielectric multilayer film and the second dielectric multilayer film is preferably in a range of 5 μm to 100 μm, more preferably in a range of 5 μm to 50 μm, particularly preferably in a range of 5 μm to 20 μm, more particularly preferably in a range of 5 μm to 10 μm, and still more particularly preferably in a range of 5 μm to 9 μm.

Three or more dielectric multilayer films may be combined together; however, from the viewpoint of decreasing the total film thickness of the selective reflection member, it is preferable to use only the first dielectric multilayer film and the second dielectric multilayer film and the dielectric multilayer member preferably does not include any other dielectric multilayer films.

The reflection central wavelength, that is, the wavelength at which the peak of the reflection ratio appears can be adjusted to be a desired wavelength by changing the thickness or refractive index of each of the layers constituting the dielectric multilayer film.

Specifically, the method for adjusting the wavelength is described in a dissertation of Journal of Display Technology, Vol. 5, No. 8, (2009) "Design Optimization of Reflective Polarizers for LCD Backlight Recycling".

A method for manufacturing the dielectric multilayer film is not particularly limited, the dielectric multilayer film can be manufactured with reference to the methods described in, for example, JP3187821B, JP3704364B, JP4037835B, JP4091978B, JP3709402B, JP4860729B, JP3448626B, and the like, and the contents thereof are incorporated into the present invention. Meanwhile, there is a case in which the dielectric multilayer film is referred to as a dielectric multilayer reflection polarizing plate or a birefringence interference polarizer of an alternate multilayer film.

A method for laminating the first dielectric multilayer film which has a reflection central wavelength in a wavelength range of 300 nm to 430 nm, reflects light linearly polarized in the first direction at the reflection central wavelength, and transmits light linearly polarized in the second direction orthogonal to the first direction and the second dielectric multilayer film which has a reflection central wavelength in a wavelength range of 300 nm to 430 nm and reflects light linearly polarized in the second direction at the reflection central wavelength is not particularly limited, and it is possible to produce the second dielectric multilayer film by laminating the same dielectric multilayer film as the first dielectric multilayer film in a state of being rotated at 90° with respect to the first dielectric multilayer film and attaching both dielectric multilayer films using an adhesive or an adhering material described below.

(Light Reflection Layer Formed by Fixing Cholesteric Liquid Crystalline Phase)

In an aspect (ii) of the liquid crystal display device of the present invention, it is preferable that the selective reflection member sequentially includes a light reflection layer formed by fixing a first cholesteric liquid crystalline phase and a light reflection layer formed by fixing a second cholesteric liquid crystalline phase, the light reflection layer formed by fixing the first cholesteric liquid crystalline phase has a reflection central wavelength in a wavelength range of 300 nm to 430 nm, reflects any one of right-circularly-polarized light and left-circularly-polarized light at the reflection central wavelength, transmits the other light, and transmits at least some of the light in a wavelength range of higher than 430 nm to 650 nm; and the light reflection layer formed by fixing the second cholesteric liquid crystalline phase has a reflection central wavelength in a wavelength range of 300 nm to 430 nm, reflects circularly polarized light in a direction different from that of the light reflection layer formed by fixing the first cholesteric liquid crystalline phase at the reflection central wavelength, and transmits at least some of the light in a wavelength range of higher than 430 nm to 650 nm.

With respect to unpolarized light in a wavelength range of 300 nm to 430 nm which enters the light reflection layer formed by fixing a cholesteric liquid crystalline phase, the light reflection layer formed by fixing a cholesteric liquid crystalline phase used in the aspect (ii) reflects or transmits (emits) any one of right-circularly-polarized light and left-circularly-polarized light. A light reflection layer formed by fixing a cholesteric liquid crystalline phase which has a reflection spectrum in which one peak of the reflection ratio with the flat maximum value and a steep rise appears at an almost constant wavelength in a certain wavelength range (for example, 360 nm to 400 nm) in a wavelength range of 300 nm to 430 nm and the reflection ratio is 0% at the other wavelengths (for example, 300 nm to 360 nm or 400 nm to 430 nm) is also included in the scope of the aspect (ii).

The total film thickness of all of the light reflection layers formed by fixing a cholesteric liquid crystalline phase including the light reflection layer formed by fixing the first cholesteric liquid crystalline phase and the light reflection layer formed by fixing the second cholesteric liquid crystalline phase is preferably in a range of 5 μm to 24 μm, more preferably in a range of 5 μm to 10 μm, and particularly preferably in a range of 5 μm to 9 μm.

Three or more light reflection layers formed by fixing a cholesteric liquid crystalline phase may be combined together; however, from the viewpoint of decreasing the total film thickness of the selective reflection member, it is preferable to use only the light reflection layer formed by fixing the first cholesteric liquid crystalline phase and the light reflection layer formed by fixing the second cholesteric liquid crystalline phase and the light reflection layer preferably does not include any other layers formed by fixing a cholesteric liquid crystalline phase.

The reflection central wavelength, that is, a wavelength at which the peak of the reflection ratio is generated can be adjusted to be a desired value by changing the pitch or refractive index of the light reflection layer formed by fixing a cholesteric liquid crystalline phase, and the change in the pitch can be easily adjusted to be a desired value by changing the amount of a chiral agent added. Specifically, what has been described above is described in detail on pp. 60 to 63 of Fujifilm Research & Development No. 50 (2005).

A method for laminating the light reflection layer formed by fixing the first cholesteric liquid crystalline phase which has a reflection central wavelength in a wavelength range of 300 nm to 430 nm, reflects light linearly polarized in the first direction at the reflection central wavelength, and transmits light linearly polarized in the second direction orthogonal to the first direction and the light reflection layer formed by fixing the second cholesteric liquid crystalline phase which has a reflection central wavelength in a wavelength range of 300 nm to 430 nm and reflects light linearly polarized in the second direction at the reflection central wavelength is not particularly limited. For example, it is possible to produce the light reflection member of the present invention by applying a light reflection layer formed by fixing the second cholesteric liquid crystalline phase for which a counterclockwise turning chiral agent is used onto a light reflection layer formed by fixing the first cholesteric liquid crystalline phase for which a clockwise turning chiral agent is used and, as necessary, drying and curing the laminate.

The method for manufacturing the light reflection layer formed by fixing a cholesteric liquid crystalline phase is not particularly limited, and it is possible to use, for example, the methods described in JP1989-133003A (JP-H1-133003A), JP3416302B, JP3363565B, and JP1996-271731A (JP-H8-271731A), the contents of which are incorporated into the present invention.

Hereinafter, the method described in JP1996-271731A (JP-H8-271731A) will be described.

As the cholesteric liquid crystal, an appropriate liquid crystal may be used and there is no particular limitation. A liquid crystal polymer is preferably used in terms of the superimposition efficiency of a liquid crystal layer, the reduction of the thickness, and the like. In addition, the cholesteric liquid crystalline molecule preferably has a greater birefringence since the wavelength range of selective reflection widens.

As the liquid crystal polymer, for example, an appropriate liquid crystal polymer such as a main chain-type liquid crystal polymer such as a polyester, a side chain-type liquid crystal polymer made of an acrylic main chain, a methacrylic main chain, or a siloxane main chain, a low molecular chiral agent-containing nematic liquid crystal polymer, a chiral component-introduced liquid crystal polymer, or a mixed liquid crystal polymer of a nematic-based liquid crystal polymer and a cholesteric-based liquid crystal polymer can be used. In terms of operability and the like, a liquid crystal polymer having a glass transition temperature in a range of 30° C. to 150° C. is preferred.

The light reflection layer formed by fixing a cholesteric liquid crystalline phase can be formed using an appropriate method such as a method in which the cholesteric liquid crystalline phase is directly applied to a support through an appropriate alignment film such as a polyimide, a polyvinyl alcohol, or an oblique evaporation layer of SiO as necessary or a method in which the cholesteric liquid crystalline phase is applied to a support that does not transform at the alignment temperature of the liquid crystal polymer made of a transparent film or the like through an alignment film as necessary. As the support, a support having a small phase difference as possible can be preferably used in terms of preventing a change in the state of polarization. In addition, a method of superimposing light reflection layers formed by fixing a cholesteric liquid crystalline phase through an alignment film or the like can be employed.

Meanwhile, the liquid crystal polymer can be applied using a method in which the liquid crystal polymer turned into a liquid phase such as a solution obtained using a solvent or a molten liquid obtained through heating is developed using an appropriate method such as a roll coating method, a gravure printing method, or a spin coating method. The thickness of a cholesteric liquid crystal layer to be formed is preferably in a range of 0.5 µm to 100 µm in terms of preventing selective reflectiveness, disturbed alignment, or a decrease in transmittance.

(Method for Attaching Selective Reflection Member)

In the liquid crystal display device of the present invention, the selective reflection member and the liquid crystal cell or the backlight-side polarizer are preferably disposed adjacent to each other directly or through an adhesive layer or a polarizing plate protective film.

In addition, in the selective reflection member, the first selective reflection region and the second selective reflection region are preferably sequentially laminated in direct contact with each other or through an adhesive layer.

When the members are integrated together, it is possible to prevent poor display caused by the thickness reduction of the members, a decrease in the interface reflection loss at an air layer in a gap between the members, and the entering of a foreign substance between the members which is likely to occur during or after the manufacturing of the liquid crystal display device.

As the method for attaching the members together, a well-known method can be used. The polarization separating member is preferably formed by transferring the light reflection layer formed by fixing a cholesteric liquid crystalline phase, which is provided on a temporary support, onto the liquid crystal cell or the backlight-side polarizer so as to be laminated and peeling the temporary support off as necessary. In addition, a roll-to-panel method can also be used and is preferred since productivity and yield are improved. The roll-to-panel method is described in JP2011-48381A, JP2009-175653A, JP4628488B, JP4729647B, WO2012/014602A, WO2012/014571, and the like, but the roll-to-panel method is not limited thereto.

Examples of a method for laminating the members in direct contact with each other include a method in which each member is laminated by being applied to another member.

In addition, an adhesive layer (adhesive layer) may be disposed between the members.

The adhesive layer refers to, for example, a substance in which the ratio (tan $\delta$=G"/G') of the storage modulus of elasticity G' to the loss modulus of elasticity G" which are measured using a dynamic viscoelasticity measurement instrument is in a range of 0.001 to 1.5, and examples thereof include adhesives, substances that easily creep, and the like. Examples of the adhesive that can be used in the present invention include acrylic adhesives and polyvinyl alcohol-based adhesives, but the adhesive is not limited thereto.

Examples of an adhesive that can be used in the adhesive layer include resins such as polyester-based resins, epoxy-based resins, polyurethane-based resins, silicone-based resins, and acrylic resins. These adhesives may be used singly or in a mixed form of two or more adhesives. Particularly, acrylic resins are preferred since the acrylic resins have excellent reliability in terms of water resistance, heat resistance, and light resistance and have a favorable adhesive force and favorable transparency, and furthermore, the refractive index is easily adjusted to be suitable for liquid crystal display. Examples of the acrylic adhesives include acrylic acid and esters thereof, methacrylic acid and esters thereof, homopolymers of acryl monomers such as acrylamide or acrylonitrile or copolymers thereof, and furthermore, copolymers of at least one acryl monomer and an aromatic vinyl monomer such as vinyl acetate, maleic anhydride, or styrene. Particularly, an adhesive which is a copolymer made up of a main polymer such as ethylene acrylate, butyl acrylate, or 2-ethylhexyl acrylate, which develops adhesiveness, a monomer such as vinyl acetate, acrylonitrile, acrylamide, styrene, methacrylate, or methyl acrylate, which serves as an aggregation force component, and furthermore, a functional group-containing monomer such as methacrylic acid, acrylic acid, itaconic acid, hydroxyethyl methacrylate, hydroxypropyl methacrylate, dimethylamino ethyl methacrylate, acrylamide, methylolacryl amide, glycidyl methacrylate, or maleic anhydride, which improves the adhesive force or imparts a crosslinking origination, has a glass transition temperature (Tg) in a range of −60° C. to −15° C., and has a weight-average molecular weight in a range of 200,000 to 1,000,000 is preferred.

As a curing agent, for example, a metal chelate-based cross-linking agent, an isocyanate-based cross-linking agent, an epoxy-based cross-linking agent, or a mixture of two or more thereof can be used as necessary. The acrylic adhesive is practically preferably formulated into in a state of including a filler described below so that the adhesive force falls into a range of 100 g/25 mm to 2000 g/25 mm. When the adhesive force is smaller than 100 g/25 mm, environment resistance is poor, particularly, there is a concern that peeling may occur at a high temperature and a high humidity. Conversely, when the adhesive force is greater than 2000 g/25 mm, there is a problem in that attachment correction is not possible or, even if possible, the adhesive remains. The refractive index (the B method according to JIS K-7142) of the acrylic adhesive is in a range of 1.45 to 1.70 and particularly preferably in a range of 1.5 to 1.65.

The adhesive includes a filler in order to adjust the refractive index to be a desired value. Examples of the filler include inorganic white pigments such as silica, calcium carbonate, aluminum hydroxide, magnesium hydroxide, clay, talc, and titanium dioxide, organic transparent or white pigments such as an acrylic resin, a polystyrene resin, a polyethylene resin, an epoxy resin, and a silicone resin, and the like. An acrylic adhesive is preferably selected since silicon beads or epoxy resin beads have excellent dispersibility with respect to the acrylic adhesive, and a uniform and favorable refractive index can be obtained. In addition, the filler is preferably a spherical filler in which light uniformly diffuses.

The particle diameter (JIS B9921) of the filler is desirably in a range of 0.1 µm to 20.0 µm and preferably in a range of 0.1 µm to 10.0 µm. Particularly, the particle diameter is preferably in a range of 0.5 µm to 10 µm.

The refractive index (the B method according to JIS K-7142) of the filler preferably has a difference from the refractive index of the adhesive in a range of 0.05 to 0.5 and more preferably in a range of 0.05 to 0.3.

The content of the filler in a diffusion adhesive layer is in a range of 1.0% by mass to 40.0% by mass and particularly desirably in a range of 3.0% by mass to 20% by mass.

<Backlight-Side Polarizing Plate and Display-Side Polarizing Plate>

Next, the backlight-side polarizing plate and the display-side polarizing plate will be described.

The polarizing plate in the liquid crystal display device of the present invention preferably includes a polarizer and a polarizing plate protective film disposed on any one surface of the polarizer and more preferably includes a polarizer and two polarizing plate protective films (hereinafter, also referred to as the protective film) disposed on both sides of the polarizer. The selective reflection member may be used as the polarizing plate protective film on the outer side of the backlight-side polarizing plate, and the polarizing plate protective film on the inner side of the backlight-side polarizing plate may not be used. In a case in which the selective reflection member is not used as the polarizing plate protective film on the outer side of the backlight-side polarizing plate and is used as a member independent of the polarizing plate protective film, in the present invention, a thinner protective film (60 µm or smaller, preferably 40 µm or smaller, and more preferably 25 µm or smaller) is preferably used in order to decrease the thickness thereof. A hard coat obtained by applying, drying, and curing a protective resin such as an acrylic resin (having a thickness of 20 µm or smaller, preferably 10 µm or smaller, and more preferably 5 µm or smaller) is more preferably used.

A polarizer not provided with a protective layer is more preferably used for realizing the additional reduction of thickness.

In the present invention, as the polarizing plate protective film on the inner side disposed on the liquid crystal cell side out of the two polarizing plate protective films, in the case of the liquid-crystal display device in a VA, IPS, TN, or OCB mode, a retardation film is more preferably used; however, in the case of the liquid-crystal display device in an IPS mode, an optical compensation film barely having a phase difference is preferably used, and the polarizing plate protective film on the inner side is preferably not used for realizing the additional reduction of thickness.

(Polarizer)

As the polarizer, a polarizer obtained by adsorbing and aligning iodine in a polymer film is preferably used. The polymer film is not particularly limited, and a variety of polymer films can be used. Examples thereof include hydrophilic macromolecular films such as a polyvinyl alcohol-based film, a polyethylene terephthalate-based film, an ethylene/vinyl acetate copolymer-based film, films obtained by partially saponifying the above-described film, a hydrophilic macromolecular film such as a cellulose-based film, a polyene-based alignment film such as a dehydrated substance of a polyvinyl alcohol or a dechlorinated substance of a polyvinyl chloride. Among these, a polyvinyl alcohol-based film having an excellent dyeing affinity due to iodine as a polarizer is preferably used.

As a material for the polyvinyl alcohol-based film, a polyvinyl alcohol or a derivative thereof is used. Examples of the derivative of a polyvinyl alcohol include polyvinyl formal, polyvinyl acetal, and furthermore, polyvinyl formal and polyvinyl acetal which are denatured using an olefin such as ethylene or propylene, a unsaturated carboxylic acid such as acrylic acid, methacrylic acid, or crotonic acid, an alkyl ester or acrylamide thereof, or the like.

The degree of polymerization of the polymer which is a material for the polymer film is generally in a range of 500 to 10,000, preferably in a range of 1000 to 6000, and more preferably in a range of 1400 to 4000. Furthermore, in the case of a saponified film, the degree of saponification is, for example, preferably 75% by mol or higher, more preferably 98% by mol or higher, and still ore preferably in a range of 98.3% by mol to 99.8% by mol in terms of solubility in water.

The polymer film (un-stretched film) is subjected to at least a uniaxial stretching treatment and a iodine dyeing treatment according to an ordinary method. Furthermore, it is possible to carry out a boric acid treatment and a cleansing treatment on the polymer film. In addition, the polymer film that has been subjected to the above-described treatments (stretched film) is dried according to an ordinary method, thereby turning into a polarizer.

A stretching method in the uniaxial stretching treatment is not particularly limited, and any of a wet stretching method and a dry stretching method can be employed. Examples of stretching means for the dry stretching method include an inter-roll stretching method, a heating roll stretching method, a compression stretching method, and the like. The polymer film can be stretched in multiple stages. In the stretching means, the un-stretched film is generally turned into a heated state. The stretching ratio of the stretched film can be appropriately set according to the purpose, and the stretching ratio (total stretching ratio) is desirably set in a range of approximately 2 times to 8 times, preferably set in a range of 3 times to 7 times, and more preferably set in a range of 3.5 times to 6.5 times.

The iodine dyeing treatment is carried out by, for example, immersing the polymer film in an iodine solution including iodine and potassium iodide. The iodine solution is generally an aqueous solution of iodine and includes iodine and potassium iodide as a solution aid. The concentration of iodine is in a range of approximately 0.01% by mass to 1% by mass and preferably in a range of 0.02% by mass to 0.5% by mass. The concentration of potassium iodide is in a range of approximately 0.01% by mass to 10% by mass and, furthermore, preferably in a range of 0.02% by mass to 8% by mass.

In the iodine dyeing treatment, the temperature of the iodine solution is generally in a range of approximately 20°

C. to 50° C. and preferably generally in a range of 25° C. to 40° C. The immersion duration is generally in a range of approximately 10 seconds to 300 seconds and preferably in a range of 20 seconds to 240 seconds. In the iodine dyeing treatment, the content of iodine and the content of potassium in the polymer film are adjusted to fall into the above-described ranges by adjusting the conditions such as the concentration of the iodine solution and the immersion temperature and immersion duration of the polymer film in the iodine solution to be desired values. The iodine dyeing treatment may be carried out in any stage of before the uniaxial stretching treatment, during the uniaxial stretching treatment, and after the uniaxial stretching treatment.

When optical characteristics are taken into account, the content of iodine in the polarizer is, for example, in a range of 2% by mass to 5% by mass and preferably in a range of 2% by mass to 4% by mass.

The polarizer preferably includes potassium. The content of potassium is preferably in a range of 0.2% by mass to 0.9% by mass and more preferably in a range of 0.5% by mass to 0.8% by mass. When the polarizer includes potassium, the polarizer has a preferred complex modulus of elasticity (Er), and a polarization film having a high degree of polarization can be obtained. Potassium can be added to the polarizer by, for example, immersing the polymer film, which is a material for forming the polarizer, in a solution including potassium. This solution may also serve as the solution including iodine.

As the drying treatment step, a well-known drying method in the related art such as natural drying, blowing drying, or heating drying can be used. For example, in heating drying, the heating temperature is in a range of approximately 20° C. to 80° C., and the drying duration is in a range of approximately 1 minute to 10 minutes. In addition, the polymer film can be appropriate stretched in the drying treatment step as well.

The thickness of the polarizer is not particularly limited, but is generally in a range of 1 µm to 100 µm, preferably in a range of 3 µm to 30 µm, and more preferably in a range of 5 µm to 20 µm.

Regarding the optical characteristics of the polarizer, when measured using a polarizer single body, the single body transmittance is preferably 43% or higher and more preferably in a range of 43.3% to 45.0%. In addition, the orthogonal transmittance, which is measured by preparing two polarizers and superimposing the polarizers so that the absorption axes of the two polarizers form 90°, is preferably smaller, practically, preferably in a range of 0.00% to 0.050%, and more preferably 0.030% or smaller. The degree of polarization is, practically, preferably in a range of 99.90% to 100% and particularly preferably in a range of 99.93% to 100%. The polarizer is preferably capable of producing almost the same optical characteristics as what have been described above even when the optical characteristics are measured as the polarizing plate as well.

(Polarizing Plate Protective Film)

Among protective films, as the protective film disposed on a side opposite to the liquid crystal cell, a thermoplastic resin having excellent transparency, mechanical strength, thermal stability, moisture-shielding properties, isotropy, and the like is used. Specific examples of the thermoplastic resin include a cellulose resin such as triacetyl cellulose, a polyester resin, a polyether sulfone resin, a polysulfone resin, a polycarbonate resin, a polyamide resin, a polyimide resin, a polyolefin resin, a (meth)acrylic resin, a cyclic polyolefin resin (norbornene-based resin), a polyarylate resin, a polystyrene resin, a polyvinyl alcohol resin, and mixtures thereof.

Particularly, in the liquid crystal display device of the present invention, in a case in which the backlight-side polarizing plate includes a polarizer and two polarization protective films disposed on both surfaces of the polarizer, and the polarization separating member is not used as the polarizing plate protective film on the outer side of the backlight-side polarizing plate, at least the polarizing plate protective film on the polarization separating member side (the side opposite to the liquid crystal cell) out of the two polarizing plate protective films is preferably a cellulose acylate film.

The cellulose resin is an ester of cellulose and an aliphatic acid. Specific examples of the cellulose ester-based resin include triacetyl cellulose, diacetyl cellulose, tripropyl cellulose, dipropyl cellulose, and the like. Among these, triacetyl cellulose is particularly preferred. A number of products of triacetyl cellulose are commercially available, and thus triacetyl cellulose is advantageous in terms of ease of procurement and costs as well. Examples of the commercially available product of triacetyl cellulose include "UV-50", "UV-80", "SH-80", "TD-80U", "TD-TAC", and "UZ-TAC" trade names manufactured by Fujifilm Corporation, "KC series" manufactured by Konica Corporation, and the like.

The cyclic polyolefin resin is, specifically, preferably a norbornene-based resin. A cyclic olefin-based resin is a collective term for resins polymerized using a cyclic olefin as a polymerization unit, and examples thereof include the resins described in JP1989-240517A (JP-H1-240517A), JP1991-14882A (JP-H3-14882A), JP1991-122137A (JP-H3-122137A), and the like. Specific examples thereof include open-ring (co)polymers of cyclic olefins, addition polymers of cyclic olefins, copolymers of a cyclic olefin and an α-olefin such as ethylene or propylene (typically, a random copolymer), graft polymers obtained by denaturing the above-described resin using unsaturated carboxylic acid or a derivative thereof, hydrogenated substances thereof, and the like. Specific examples of the cyclic olefin include norbornene-based monomers.

As the cyclic polyolefin resin, a variety of products are commercially available. Specific examples thereof include "ZEONEX", "ZEONOA" trade names manufactured by ZEON Corporation, "ARTON" trade name manufactured by JSR Corporation, "TOPAS" trade name manufactured by TICONA Corporation, and "APEL" trade name manufactured by Mitsui Chemicals, Inc.

As the (meth)acrylic resin, an arbitrary appropriate (meth) acrylic resin can be employed as long as the effects of the present invention are not impaired. Examples thereof include poly(meth)acrylic acid esters such as methyl polymethacrylate, methyl methacrylate-(meth)acrylic acid copolymers, methyl methacrylate-(meth)acrylic acid ester copolymers, methyl methacrylate-acrylic acid ester-(meth) acrylic acid copolymer, methyl (meth)acrylate-styrene copolymers (MS resins and the like), and polymers having an alicyclic hydrocarbon group (for example, methyl methacrylate-cyclohexyl methacrylate copolymer, methyl methacrylate-(meth)acrylic acid norbornyl copolymer, and the like). Preferred examples thereof include C1-6 alkyl poly(meth) acrylate such as methyl poly(meth)acrylate, and more preferred examples thereof include methyl methacrylate-based resins including methyl methacrylate as a main component (50% by mass to 100% by mass and preferably 70% by mass to 100% by mass).

Specific examples of the (meth)acrylic resin include ACRYPET VH and ACRYPET VRL20A manufactured by Mitsubishi Rayon Co., Ltd., the (meth)acrylic resin having a ring structure in the molecule described in JP2004-70296A, and the (meth)acrylic resin having a high Tg which is obtained through intramolecular cross-linking or an intramolecular cyclization reaction.

As the (meth)acrylic resin, it is also possible to use a (meth)acrylic resin having a lactone ring structure. This is because the (meth)acrylic resin has high heat resistance, high transparency, and high mechanical strength when being biaxial-stretched.

The thickness of the protective film can be appropriately set and is generally in a range of approximately 1 μm to 500 μm in terms of strength, operability such as handling, and thin layer properties. Particularly, the thickness thereof is preferably in a range of 1 μm to 300 μm and more preferably in a range of 5 μm to 200 μm. The thickness of the protective film is particularly suitably in a range of 5 μm to 150 μm.

Re (λ) and Rth (λ) respectively represent the in-plane retardation and the retardation in the thickness direction at a wavelength λ. Re (λ) is measured by introducing light having a wavelength of λ nm in the film normal direction in a KOBRA 21ADH or WR (manufactured by Oji Scientific Instruments Co., Ltd.). When selecting the measurement wavelength of λ nm, it is possible to measure the retardations by manually exchanging wavelength selective filters or converting a measurement value using a program or the like. In a case in which a film to be measured is expressed as a uniaxial or biaxial index ellipsoid, Rth (λ) is computed using the following method. Meanwhile, a part of this measurement method is also used for the measurement of the average tilt angle on the alignment film side of a discotic liquid crystal compound molecule in an optical anisotropic layer described below and an average tilt angle on the side opposite thereto.

Rth (λ) is computed as described below. Re (λ) is measured at a total of six points by introducing light having a wavelength of λ nm in directions tilted at 10 degree intervals from the normal direction to the film, which is determined using the in-plane slow axis (determined using KOBRA 21ADH or WR) as a tilt axis (rotational axis) (in a case in which there is no slow axis, an arbitrary direction in the film is used as the rotational axis), through 50° toward a single side, and Rth (λ) is computed on the basis of the measured retardation values, an assumed average refractive index, and the input film thickness value using KOBRA 21AD or WR. In the above description, in the case of a film having a direction in which the retardation value reaches zero at a certain tilt angle from the normal direction determined using the in-plane slow axis as the rotational axis, the retardation value at a tilt angle larger than the above-described tilt angle is changed into a negative value and then is computed using KOBRA 21ADHI or WR. Meanwhile, Rth (λ) can also be computed as described below. Retardation values are measured in two arbitrary tilt directions using the slow axis as a tilt axis (rotational axis) (in a case in which there is no slow axis, an arbitrary direction in the film is used as the rotational axis), and Rth is computed on the basis of the above-described values, an assumed average refractive index, and the input film thickness value using Expressions (A) and (B) below.

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)}$$

Expression (A)

Meanwhile, the Re (θ) represents a retardation value in a direction tilted at an angle θ from the normal direction. In addition, in Expression (A), nx represents the refractive index in the slow axis direction in the plane, ny represents the refractive index in a direction orthogonal to nx in the plane, and nz represents the refractive index in a direction orthogonal to nx and ny. d represents the film thickness.

$$Rth = ((nx+ny)/2 - nz) \times d$$  Expression (B)

In a case in which a film to be measured cannot be expressed as a uniaxial or biaxial index ellipsoid, that is, does not have any optic axis, Rth (λ) is computed using the following method. Re (λ) is measured at a total of 11 points by introducing light having a wavelength of λ nm in directions tilted at 10 degree intervals from −50° to +500 with respect to the normal direction to the film, which is determined using the in-plane slow axis (determined using KOBRA 21ADH or WR) as a tilt axis (rotational axis), and Rth (λ) is computed on the basis of the measured retardation values, an assumed average refractive index, and the input film thickness value using KOBRA 21AD or WR. In the above measurement, as the assumed average refractive index, values from a polymer handbook (JOHN WILEY & SONS, INC) and a variety of optical film catalogues can be used. For optical films having unknown average refractive index values, the refractive index values can be measured using an Abbe refractometer. The average refractive index values of the major optical films will be described below: cellulose acylate (1.48), cycloolefin polymer (1.52), polycarbonate (1.59), polymethyl methacrylate (1.49), and polystyrene (1.59). When these assumed average refractive index values and the film thickness are input, KOBRA 21ADH or WR computes nx, ny, and nz. Nz is further computed using the computed nx, ny, and nz from an equation Nz=(nx−nz)/(nx−ny).

Meanwhile, in the present specification, "visible light" refers to light having a wavelength in a range of 380 nm to 780 nm. In addition, in the present specification, the measurement wavelength is 550 nm unless particularly specified.

In addition, in the present specification, angles (for example, angles such as "90°") and relationships therebetween (for example, "orthogonal", "parallel", "crossing at 45°", and the like) do not necessarily need to be exact as long as the margin of error is within an acceptable range in the technical field to which the present invention belongs. For example, a specific angle means an angle in a range of the specific angle ±10°, and the margin of error from the specific angle is preferably 5° or lower and more preferably 3° or lower.

In the present specification, the "slow axis" in the retardation film or the like refers to a direction in which the refractive index becomes greatest.

In addition, in the present specification, numeric values, numeric ranges, and qualitative expressions (for example, expressions such as "identical" and "equivalent") indicating the optical characteristics of the respective members such as a phase difference region, the retardation film, and the liquid crystal layer are interpreted to include numeric values, numeric ranges, and properties having a margin of error within a range generally acceptable in the liquid crystal display device and the members used therein.

In addition, in the present specification, "front surface" refers to the normal direction to the display surface, "front surface contrast (CR)" refers to the contrast computed from white luminance and black luminance measured in the normal direction to the display surface, and "view angle contrast (CR)" refers to the contrast computed from white luminance and black luminance measured in a tilt direction tilted from the normal direction to the display surface (for example, a direction defined as 60 degrees in the polar angle direction with respect to the display surface).

(Adhesive Layer)

For attachment between the polarizer and the protective film, it is possible to appropriately employ an adhesive or the like depending on the polarizer and the protective film. The adhesive and an adhesion treatment method are not particularly limited, and, for example, the polarizer and the protective film can be attached together using an adhesive made of a vinyl polymer, an adhesive made of at least a water-soluble cross-linking agent of a vinyl alcohol-based polymer such as boric acid, borax, glutaraldehyde, melamine, or oxalic acid. The adhesive layer made of the above-described adhesive can be formed in a form of an applied and dried layer of an aqueous solution or the like, and, in preparation of the aqueous solution, it is possible to formulate a cross-linking agent, other additives, and a catalyst such as an acid as necessary. Particularly, in a case in which a polyvinyl alcohol-based polymer film is used as the polarizer, an adhesive including a polyvinyl alcohol-based resin is preferably used in terms of adhesiveness. Furthermore, an adhesive including a polyvinyl alcohol-based resin having an acetoacetyl group is more preferred in terms of improving durability.

The polyvinyl alcohol-based resin is not particularly limited, but a polyvinyl alcohol-based resin having an average degree of polarization in a range of approximately 100 to 3000 and an average degree of saponification in a range of approximately 85% by mol to 100% by mol is preferred in terms of adhesiveness. In addition, the concentration of the adhesive aqueous solution is not particularly limited, but is preferably in a range of 0.1% by mass to 15% by mass and more preferably in a range of 0.5% by mass to 10% by mass. The thickness of the dried adhesive layer is preferably in a range of approximately 30 nm to 1000 nm and more preferably in a range of 50 nm to 300 nm. When the thickness is too thin, the adhesive force becomes insufficient, and, when the thickness is too thick, there is a high possibility that a problem may be caused in terms of appearance.

As additional examples of the adhesive, it is possible to use a thermosetting resin or an ultraviolet-curable resin such as a (meth)acrylic resin, an urethane-based resin, an acrylurethane-based resin, an epoxy-based resin, or a silicone-based resin.

<Liquid Crystal Cell>

The constitution of the liquid crystal cell is not particularly limited, and it is possible to employ a liquid crystal cell having an ordinary constitution. The liquid crystal cell includes, for example, a pair of substrates disposed opposite to each other and a liquid crystal layer sandwiched between a pair of the substrates and may include a color filter layer or the like as necessary. The driving mode of the liquid crystal cell is also not particularly limited, and it is possible to use a variety of modes such as twisted nematic (TN), super twisted nematic (STN), vertical alignment (VA), in-plane switching (IPS), and optically compensated bend cell (OCB).

The liquid crystal cell used in the liquid crystal display device of the present invention is preferably a VA-mode liquid crystal cell, an OCB-mode liquid crystal cell, an IPS-mode liquid crystal cell, or a TN-mode liquid crystal cell, but is not limited thereto.

In the TN-mode liquid crystal cell, when no voltage is applied thereto, rod-like liquid crystal molecules are substantially horizontally aligned and, furthermore, are aligned in a twisted manner at 60° to 120°. The TN-mode liquid crystal cell is most frequently used as a color TFT liquid crystal display device and is described in a number of publications.

In the VA-mode liquid crystal cell, when no voltage is applied thereto, rod-like liquid crystal molecules are substantially vertically aligned. Examples of the VA-mode liquid crystal cell include not only (1) a narrowly-defined VA-mode liquid crystal cell in which rod-like liquid crystal molecules are substantially vertically aligned when no voltage is applied thereto and substantially horizontally aligned when a voltage is applied thereto (described in JP1990-176625A (JP-H12-176625A)) but also (2) a (MVA-mode) liquid crystal cell obtained by forming multi-domains in the VA-mode liquid crystal cell in order to expand the view angle (described on p. 845 in SID97, Digest of tech. Papers (proceedings) 28 (1997)), (3) a liquid crystal cell having a mode in which rod-like liquid crystal molecules are substantially vertically aligned when no voltage is applied thereto and are twisted and multi-domain-aligned when a voltage is applied thereto (n-ASM mode) (described in Proceedings 58 and 59 (1998) of Japanese Liquid Crystal Conference), and (4) a SURVIVAL-mode liquid crystal cell (disclosed in LCD International 98). In addition, the VA-mode liquid crystal cell may be any one of a patterned vertical alignment (PVA)-type liquid crystal cell, an optical alignment-type liquid crystal cell, and a polymer-sustained alignment (PSA) liquid crystal cell. Details of the above-described modes are described in detail in JP2006-215326A and JP2008-538819A.

In the IPS-mode liquid crystal cell, rod-like liquid crystal molecules are aligned substantially parallel to the substrate, and the liquid crystal molecules respond in a planar manner when a planar electric field is applied to the substrate surface. The IPS-mode liquid crystal cell displays black when no electric field is applied thereto, and the absorption axes of a pair of top and bottom polarizing plates are orthogonal to each other. A method for improving a view angle by reducing leakage of light occurring when the liquid crystal cell displays black in a tilt direction using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), JP1998-307291A (JP-H10-307291A), and the like.

An embodiment of the liquid crystal display device is preferably constituted by including a liquid crystal cell in which a liquid crystal layer is sandwiched between facing substrates at least one of which is provided with an electrode and disposing the liquid crystal cell between two polarizing plates. The liquid crystal display device includes a liquid crystal cell in which liquid crystals are sealed between top and bottom substrates and displays an image by applying a voltage thereto so as to change the alignment state of the liquid crystals. Furthermore, the liquid crystal display device includes functional layers accompanying a polarizing plate protective film, an optical compensation member performing optical compensation, and an adhesive layer as necessary.

<Other Members>

In addition, the liquid crystal display device of the present invention may include other members. For example, surface layers such as a forward scattering layer, a primer layer, an antistatic layer, and an undercoat layer may be disposed together with (or in place of) a color filter substrate, a thin film transistor substrate, a lens film, a diffusion sheet, a hard coat layer, an antireflection layer, a temporary reflection layer, an antiglare layer, and the like.

(Color Filter)

Regarding pixels in the present invention, in a case in which visible light B having a wavelength of 500 nm or shorter is used as a light source, as a method for forming RGB pixels, a variety of well-known methods can be used. For example, it is possible to form a desired black matrix and R, G, and B pixel patterns on a glass substrate using a photomask and a photoresist or to form a black matrix having a desired width using R, G, and B pixel-coloring inks and eject an ink composition into a region partitioned by black matrixes which has a width larger than that of the above-described black matrix provided every n pixels (a concave section surrounded by convex sections) until a desired concentration thereof is reached, thereby producing a color filter made up of R, G, and B patterns. After the image is colored, individual pixels and the black matrixes may be completely cured through baking or the like.

Preferred characteristics of the color filter are described in JP2008-083611A, the content of which is incorporated into the present invention.

For example, in a color filter exhibiting green, one of the wavelengths at which the transmittance reaches half the maximum transmittance is preferably in a range of 590 nm to 610 nm, and the other is preferably in a range of 470 nm to 500 nm. In addition, in a color filter exhibiting green, one of the wavelengths at which the transmittance reaches half the maximum transmittance is preferably in a range of 590 nm to 600 nm. Furthermore, in a color filter exhibiting green, the maximum transmittance is preferably 80% or higher. In a color filter exhibiting green, the wavelengths at which the transmittance reaches the maximum is preferably in a range of 530 nm to 560 nm.

In the light source included in a light source unit, the wavelength of a light emission peak in a wavelength range of 600 nm to 700 nm is preferably in a range of 620 nm to 650 nm. The light source included in the light source unit has a light emission peak in a wavelength range of 600 nm to 700 nm, and, in a color filter exhibiting green, the transmittance at the wavelength of the light emission peak is preferably 10% or lower of the maximum transmittance.

In a color filter exhibiting red, the transmittance in a range of 580 nm to 590 nm is preferably 10% or lower of the maximum transmittance.

As pigments for the color filter, C. I. Pigment Blue 15:6 and, as a complementary pigment, C. I. Pigment Violet 23 are used for blue. C. I. Pigment Red 254 and, as a complementary pigment, C. I. Pigment Yellow 139 are used for red. As green pigments, generally, C. I. Pigment Green 36 (copper phthalocyanine bromide green), C. I. Pigment Green 7 (copper phthalocyanine chloride green), as complementary pigments, C. I. Pigment Yellow 150, C. I. Pigment Yellow 138, and the like are used. The half value wavelength can be controlled by adjusting the composition of these pigments. The half value wavelength on the long wavelength side can be set in a range of 590 nm to 600 nm by increasing the amount of the composition of the complementary pigments little by little with respect to a comparative example. Meanwhile, currently, pigments are generally used, but dyes may be used for the color filter as long as the dyes are colorants capable of controlling the spectroscope and of ensuring process stability and reliability.

(Black Matrix)

In the liquid crystal display device of the present invention, a black matrix is disposed between individual pixels. Examples of a material forming the black stripe include a sputtered film of a metal such as chromium, a light-shielding photosensitive composition obtained by combining a photosensitive resin or a black coloring agent, and the like. Specific examples of the black coloring agent include carbon black, titanium carbon, iron oxide, titanium oxide, graphite, and the like, and, among these, carbon black is preferred.

(Thin Film Transistor)

The liquid crystal display device of the present invention preferably further includes a TFT substrate including a thin film transistor (hereinafter, also referred to as TFT).

The thin film transistor preferably includes an oxide semiconductor layer having a carrier concentration of lower than $1 \times 10^{14}/cm^3$. A preferred aspect of the thin film transistor is described in JP2011-141522A, the content of which is incorporated into the present invention.

EXAMPLES

Hereinafter, characteristics of the present invention will be more specifically described using examples and comparative examples. Materials, used amounts, proportions, processing contents, processing orders, and the like described in the following examples can be appropriately altered within the purport of the present invention. Therefore, the scope of the present invention should not be limitedly interpreted by specific examples described below.

Example 1

Preparation of Polarizing Plate 1

As a front-side polarizing plate protective film of a backlight-side polarizing plate, a commercially available cellulose acylate-based film "TD60" (manufactured by Fujifilm Corporation) was used.

As a rear-side polarizing plate protective film of the backlight-side polarizing plate, a cellulose acylate-based film "TD60" (manufactured by Fujifilm Corporation) was used. A polarizer was manufactured in the same manner as described in Paragraphs [0219] and [0220] of JP2006-293275A, and the above-described two polarizing plate protective films were attached to both surfaces of the polarizer, thereby manufacturing a polarizing plate 1.

<Formation of Selective Reflection Member>

(Formation of Dielectric Multilayer Film)

A UV narrowband UV reflection dielectric multilayer film 2-A was changed with reference to IDW/AD' 12, pp. 985 to 988 (2012) so that the total thickness reached 5 µm, and a dielectric multilayer film was manufactured so that the reflection central wavelength of the peak of the maximum reflection ratio in a wavelength range corresponding to UV light reached 365 nm and the half bandwidth reached 30 nm.

A UV narrowband UV reflection dielectric multilayer film 1-A was manufactured by cutting out a dielectric multilayer film obtained by rotating the UV reflection dielectric multilayer film 2-A 90° to the same size as that of the UV reflection dielectric multilayer film 2-A.

The UV narrowband UV reflection dielectric multilayer film 2-A and the UV narrowband UV reflection dielectric multilayer film 1-A were respectively attached onto a polarizing plate 1 in this order using an acrylic adhesive having a refractive index of 1.47.

(Measurement of Reflection Ratio)

As the reflection ratio of unpolarized UV light entering the selective reflection member including the UV narrowband UV reflection dielectric multilayer film 2-A and the UV narrowband UV reflection dielectric multilayer film 1-A, the reflection ratio at a wavelength of 365 nm was measured using a spectrometer "V-550" (manufactured by JASCO Corporation). The results are shown in Table 1 below.

<Formation of Light Conversion Member>

As a light conversion member, with reference to U.S. Pat. No. 7,303,628B, a dissertation (Peng, X. G; Manna, L.; Yang, W. D.; Wickham, j.; Scher, E.; Kadavanich, A.; Alivisatos, A. P. Nature 2000, 404, 59 to 61), and a dissertation (Manna, L.; Scher, E. C.; Alivisatos, A. P. j. Am. Chem. Soc. 2000, 122, 12700 to 12706), a quantum rod 1 which emitted blue fluorescent light having a central wavelength of 450 nm and a half bandwidth of 40 nm, a quantum rod 2 which emitted green fluorescent light having a central wavelength of 540 nm and a half bandwidth of 40 nm, and a quantum rod 3 which emitted red fluorescent light having a central wavelength of 645 nm and a half bandwidth of 30 nm when unpolarized UV light from a UV light-emitting diode entered the rods were formed. The shapes of the quantum rods 1, 2, and 3 were rectangular parallelepiped shapes, and the average of the lengths of the long axes of the quantum rods was 30 nm. Meanwhile, the average of the lengths of the long axes of the quantum rods was confirmed using a transmission electron microscope. Next, a quantum rod sheet 1 in which the quantum rods were dispersed was produced using the following method.

As a base material, a sheet of isophthalic acid-copolymerized polyethylene terephthalate copolymerized with 6 mol % of isophthalic acid (hereinafter, refer to "amorphous PET") was produced. The glass transition temperature of the amorphous PET is 75° C. A laminate made up of the amorphous PET base material and a quantum rod-aligned layer was produced as described below. Here, the quantum rod-aligned layer includes the produced quantum rods 1, 2, and 3 using a polyvinyl alcohol (hereinafter, refer to "PVA") as a matrix. That is, the glass transition temperature of PVA is 80° C.

A quantum rod-containing PVA aqueous solution was prepared by dissolving PVA powder having a degree of polymerization of 1000 or higher, a degree of saponification of 99% or higher (at a concentration of 4% to 5%) and the quantum rods 1, 2, and 3 produced above (at a concentration of 1% respectively) in water. In addition, a 200 μm-thick amorphous PET base material was prepared. Next, the quantum rod-containing PVA aqueous solution was applied to the 200 μm-thick amorphous PET base material and was dried at a temperature in a range of 50° C. to 60° C., thereby forming a 25 μm-thick quantum rod-containing PVA layer on the amorphous PET base material. A laminate of the amorphous PET and the quantum rod-containing PVA will be called a quantum rod sheet 1.

The quantum rod sheet 1 was put into a stretching apparatus disposed in an oven set to a stretching temperature environment of 130° C., and the free end was uniaxially stretched so that the stretching ratio reached three times. Due to this stretching treatment, in the quantum rod-containing PVA layer in the stretched laminate, PVA molecules were aligned, and accordingly, the quantum rod-containing PVA layer was changed to a 15 μm-thick quantum rod-containing PVA layer in which the quantum rods were aligned. This quantum rod-containing PVA layer will be called a quantum rod-aligned sheet 1. Meanwhile, the long-axis alignment state of the quantum rod was confirmed using a transmission electron microscope. In addition, in the quantum rod-aligned sheet 1, the mass of the quantum rod per unit area was 0.005 $g/m^2$.

<Manufacturing of Liquid Crystal Display Device>

A commercially available liquid crystal display device (manufactured by Panasonic Corporation, trade name: TH-L42D2) was disassembled, the backlight-side polarizing plate was changed to the polarizing plate 1 including the UV narrowband UV reflection dielectric multilayer film 2-A and the UV narrowband UV reflection dielectric multilayer film 1-A disposed on the rear side, which had been manufactured above, the quantum rod-aligned sheet 1 manufactured above was disposed between the UV narrowband UV reflection dielectric multilayer film 1-A and a backlight unit so that the alignment direction of the fluorescent material became parallel to the absorption axis of the display-side polarizing plate (a commercially available product), and the backlight unit was changed to the following UV narrowband backlight unit, thereby manufacturing a liquid crystal display device of Example 1.

The UV narrowband backlight unit used was a surface light source including a UV light-emitting diode (Nichia UV-LED: NC4U133A, main wavelength of 365 nm, a half bandwidth of 9 nm, hereinafter, also referred to as a UV light source) as a light source. In addition, the UV narrowband backlight unit includes a reflection member which reflects light emitted from the light source and reflected by an optical sheet member in a rear portion of the light source.

Example 2

Formation of Selective Reflection Member

A dielectric multilayer film 2-B was formed in the same manner as in the manufacturing of the dielectric multilayer film 2-A used in Example 1 except for the fact that a UV narrowband UV reflection dielectric multilayer film was changed with reference to IDW/AD' 12, pp. 985 to 988 (2012) so that the total thickness reached 3 μm. A dielectric multilayer film 1-B was formed in the same manner as in the manufacturing of the dielectric multilayer film 1-A used in Example 1.

The UV reflection dielectric multilayer film 2-B and the UV reflection dielectric multilayer film 1-B were sequentially attached onto the polarizing plate 1 in the same manner as in Example 1.

In Example 1, a liquid crystal display device of Example 2 was manufactured in the same manner as in Example 1 except for the fact that, in Example 1, the polarizing plate 1 including the UV reflection dielectric multilayer films 2-B and 1-B, which had been formed above, disposed on the rear side was used instead of the polarizing plate 1 including the UV narrowband UV reflection dielectric multilayer films 2-A and 1-A disposed on the rear side.

Example 3

Formation of Selective Reflection Member (Formation of Light Reflection Layer Formed by Fixing Cholesteric Liquid Crystalline Phase)

A light reflection layer formed by fixing a cholesteric liquid crystalline phase was formed on a support by means of coating by changing the added amount of a chiral agent used with reference to pp. 60 to 63 of Fujifilm Research & Development No. 50 (2005). The obtained light reflection layer formed by fixing a cholesteric liquid crystalline phase was considered as a UV reflection CLC1 (left-circularly-polarized light reflection).

A light reflection layer formed by fixing a cholesteric liquid crystalline phase was formed on the UV reflection CLC1 (left-circularly-polarized light reflection) by means of coating in the same manner as in the formation of the UV reflection CLC1 (left-circularly-polarized light reflection) except for the fact that the kind of the chiral agent used was changed to a chiral agent capable of forming a counter-clockwise cholesteric liquid crystalline structure. The obtained light reflection layer formed by fixing a cholesteric liquid crystalline phase was considered as a UV reflection CLC2 (right-circularly-polarized light reflection).

For both the UV reflection CLC1 (left-circularly-polarized light reflection) and the UV reflection CLC2 (right-circularly-polarized light reflection), the reflection central wavelengths of the peaks of the maximum reflection ratios were 365 nm, the half bandwidths were all 40 nm, the film thicknesses were all 3 µm, Δn's of liquid crystals were all 0.12, and the average refractive indexes were all 1.57. In addition, in a case in which a liquid crystal having Δn of 0.17 was used, a reflection central wavelength of 365 nm, a half bandwidth of 100 nm, and a film thickness of 3 µm could be realized.

(Measurement of Reflection Ratio)

The reflection ratio of unpolarized UV light entering the laminate including the UV reflection CLC2 (right-circularly-polarized light reflection) and the UV reflection CLC1 (left-circularly-polarized light reflection) on the support was measured using a spectrometer "V-550" (manufactured by JASCO Corporation). The results are shown in Table 1 below.

After that, the UV reflection CLC2 (right-circularly-polarized light reflection) and the UV reflection CLC1 were peeled off from the support of the laminate including the UV reflection CLC2 (right-circularly-polarized light reflection) and the UV reflection CLC1 (left-circularly-polarized light reflection) on the support, which had been formed above, and were transferred onto the surface of the polarizing plate 1.

<Manufacturing of Liquid Crystal Display Device>

In Example 1, a liquid crystal display device of Example 3 was manufactured in the same manner as in Example 1 except for the fact that, in Example 1, the following fact was changed.

Instead of the selective reflection member including the UV reflection dielectric multilayer film 2-A and the UV reflection dielectric multilayer film 1-A on the polarizing plate 1, the selective reflection member including the UV reflection CLC2 (right-circularly-polarized light reflection) and the UV reflection CLC1 on the polarizing plate 1 was used.

Example 4

A liquid crystal display device of Example 4 was manufactured in the same manner as in Example 3 except for the fact that, in Example 3, the UV reflection CLC2 (right-circularly-polarized light reflection) and the UV reflection CLC1 (left-circularly-polarized light reflection) were transferred from the support of the laminate including the UV reflection CLC2 (right-circularly-polarized light reflection) and the UV reflection CLC1 (left-circularly-polarized light reflection) on the support onto a liquid crystal cell instead of the polarizing plate 1.

Comparative Example 1

A liquid crystal display device of Comparative Example 1 was manufactured in the same manner as in Example 3 except for the fact that, in the manufacturing of the liquid crystal display device of Example 3, the polarizing plate 1 manufactured above was used instead of the laminate of the polarizing plate 1, the UV reflection CLC2, and the UV reflection CLC1.

Comparative Example 2

In the manufacturing of the liquid crystal display device of Example 3, the dielectric multilayer film (trade name DBEF, manufactured by 3M Japan Limited, indicated as DBEF of the related art in Table 1 below) was separately disposed without providing any adhesive layer between the backlight-side polarizing plate and the backlight-side unit, thereby manufacturing a liquid crystal display device of Comparative Example 2.

The dielectric multilayer film (trade name DBEF) has a reflection ratio having a flat peak at an almost constant wavelength in a range of 300 nm to 450 nm to 550 nm to 630 nm which fell into the ultraviolet to blue to green to red range.

[Evaluation]

The liquid crystal display devices of the respective examples and the respective comparative examples were evaluated according to the following standards.

(Front Surface Luminance)

The front surface luminance (white luminance) of the liquid crystal display device was measured using the method described in Paragraph [0180] of JP2009-93166A. The results are shown in Table 1 below.

Meanwhile, the front surface luminance of the liquid crystal display device, practically, needs to be 200 cd/m² or higher and is preferably 210 cd/m² or higher and more preferably 220 cd/m² or higher.

(Color Reproduction Region)

The color reproduction region (NTSC ratio) of the liquid crystal display device was measured using the method described in Paragraph [0066] of JP2012-3073A. The results are shown in Table 1 below.

Meanwhile, the color reproduction region (NTSC ratio) is preferably 80% or higher, more preferably 90% or higher, and particularly preferably 100%.

(External Light Reflection Ratio)

The external light reflection ratio of the liquid crystal display device was measured using a colorimeter (manufactured by Konica Minolta, Inc., CM-2022) according to the method described in JP2009-186605A. The results are shown in Table 1 below.

Meanwhile, the external light reflection ratio of the liquid crystal display device is preferably 10% or lower, more preferably 6% or lower, and particularly preferably 5% or lower.

(Front Surface Contrast (CR))

The front surface contrast of the liquid crystal display device was measured using the method described in Paragraph [0180] of JP2009-93166A.

The results are shown in Table 1 below.

Meanwhile, the front surface contrast of the liquid crystal display device is preferably 300 or higher, more preferably 1000 or higher, and particularly preferably 1100 or higher.

From Table 1, it was found that the liquid crystal display device of the present invention was improved in terms of the front surface luminance.

Meanwhile, from Comparative Examples 1 and 2, it was found that, in a case in which a selective reflection member satisfying the constitution of the present invention was not used, the front surface luminance was low. Specifically, it was found from Comparative Example 1 that, in a case in

TABLE 1

|  |  | Example 1 | Example 2 | Example 3 |
|---|---|---|---|---|
| Constitution | Display-side polarizing plate | Polarizing plate in commercially available LCD | Polarizing plate in commercially available LCD | Polarizing plate in commercially available LCD |
|  | Liquid crystal cell | Liquid crystal cell in commercially available LCD | Liquid crystal cell in commercially available LCD | Liquid crystal cell in commercially available LCD |
|  | Backlight-side polarizing plate | Polarizing plate 1 | Polarizing plate 1 | Polarizing plate 1 |
| Selective reflection member | Second selective reflection region | UV reflection dielectric multilayer film 2-A | UV reflection dielectric multilayer film 2-B | UV reflection CLC2 (right-circularly-polarized light reflection) |
|  | First selective reflection region | UV reflection dielectric multilayer film 1-A | UV reflection dielectric multilayer film 1-B | UV reflection CLC1 (left-circularly-polarized light reflection) |
|  | Reflection ratio with respect to incidence light [%] | 100% | 100% | 100% |
|  | Total thickness of all layers [μm] | 10 | 6 | 6 |
|  | Light conversion member | Quantum rod alignment sheet 1 | Quantum rod alignment sheet 1 | Quantum rod alignment sheet 1 |
|  | Light source in backlight unit | UV light source | UV light source | UV light source |
| Evaluation | Front surface luminance [cd/m$^2$] | 220 | 220 | 220 |
|  | Color reproduction region NTSC ratio [%] | 100 | 100 | 100 |
|  | External light reflection ratio | 5% | 5% | 5% |
|  | Front surface contrast | 1200 | 1200 | 1200 |

|  |  | Example 4 | Comparative Example 1 | Comparative Example 2 |
|---|---|---|---|---|
| Constitution | Display-side polarizing plate | Polarizing plate in commercially available LCD | Polarizing plate in commercially available LCD | Polarizing plate in commercially available LCD |
|  | Liquid crystal cell | Liquid crystal cell in commercially available LCD | Liquid crystal cell in commercially available LCD | Liquid crystal cell in commercially available LCD |
|  | Backlight-side polarizing plate | None | Polarizing plate 1 | Polarizing plate 1 |
| Selective reflection member | Second selective reflection region | UV reflection CLC2 (right-circularly-polarized light reflection) | None | None |
|  | First selective reflection region | UV reflection CLC1 (left-circularly-polarized light reflection) | None | DBEF of the related art |
|  | Reflection ratio with respect to incidence light [%] | 100% | — | 50% |
|  | Total thickness of all layers [μm] | 6 | — | 25 |
|  | Light conversion member | Quantum rod alignment sheet 1 | Quantum rod alignment sheet 1 | Quantum rod alignment sheet 1 |
|  | Light source in backlight unit | UV light source | UV light source | UV light source |
| Evaluation | Front surface luminance [cd/m$^2$] | 240 | 160 | 190 |
|  | Color reproduction region NTSC ratio [%] | 100 | 100 | 100 |
|  | External light reflection ratio | 7% | 5% | 5% |
|  | Front surface contrast | 300 | 1200 | 1200 | which the selective reflection member was not used, the front surface luminance was significantly low. It was found from Comparative Example 2 that, in a case in which, instead of the selective reflection member satisfying the constitution of the present invention, only one UV narrow-band dielectric multilayer film (DBEF) was used and a selective reflection member having a reflection ratio below the lower limit value regulated by the present invention was used, the front surface luminance was low.

Meanwhile, it was also found from Table 1 that, in a preferred aspect of the liquid crystal display device of the present invention, the color reproduction region, the external light reflection ratio, and the front surface contrast also became favorable.

Meanwhile, the fact that the light conversion member emitted linearly polarized light having a vibration direction parallel to the absorption axis of the polarizer in the display-side polarizing plate was confirmed using the method described in the present specification.

EXPLANATION OF REFERENCES

1: backlight-side polarizing plate
2: polarizing plate protective film (inner side)
3: backlight-side polarizer
4: polarizing plate protective film (outer side)
5: selective reflection member
5a: first selective reflection region
5b: second selective reflection region
16: light conversion member (converting unpolarized light to linearly polarized blue light, linearly polarized green light, and linearly polarized red light)
17B, 17G, 17R: aligned fluorescent material
31: backlight unit
31A: light source
31B: light guide plate
31C: reflection member
32: unpolarized light (incidence light from backlight unit)
33: light reflected by selective reflection member
34: blue light (linearly polarized blue light emitted from light conversion member)
35: green light (linearly polarized green light emitted from light conversion member)
36: red light (linearly polarized red light emitted from light conversion member)
37: retroreflective light
42: liquid crystal cell
44: display-side polarizing plate
45: polarizing plate protective film (outer side)
46: display-side polarizer
47: polarizing plate protective film (inner side)
51: liquid crystal display device

What is claimed is:

1. A liquid crystal display device comprising:
a backlight unit, a light conversion member, a selective reflection member, a liquid crystal cell, and a display-side polarizer disposed in this order,
wherein the backlight unit includes a light source that emits unpolarized light having a light emission central wavelength in a wavelength range of 300 nm to lower than 430 nm,
the selective reflection member reflects 60% to 100% of the unpolarized light entering the selective reflection member and transmits at least some of light in a wavelength of higher than 430 nm to 650 nm, and
the light conversion member includes an aligned fluorescent material that, due to the unpolarized light entering the light conversion member, emits
blue light which has a light emission central wavelength in a wavelength range of 430 nm to 480 nm and is light linearly polarized in a vibration direction parallel to an absorption axis of the display-side polarizer,
green light which has a light emission central wavelength in a wavelength range of 500 nm to 600 nm and is light linearly polarized in the vibration direction parallel to the absorption axis of the display-side polarizer, and
red light which has a light emission central wavelength in a wavelength range of 600 nm to 650 nm and is light linearly polarized in the vibration direction parallel to the absorption axis of the display-side polarizer.

2. The liquid crystal display device according to claim 1, wherein the unpolarized light is made up of light in a first polarization state and light in a second polarization state,
the selective reflection member sequentially includes a first selective reflection region and a second selective reflection region from a backlight side,
the first selective reflection region reflects the light in the first polarization state out of the unpolarized light entering the first selective reflection region, transmits the light in the second polarization state while maintaining the polarization state, and transmits light in a wavelength range of higher than 430 nm to 650 nm, and
the second selective reflection region reflects the light in the second polarization state which passes through the first selective reflection region and enters the second selective reflection region and transmits light in a wavelength range of higher than 430 nm to 650 nm.

3. The liquid crystal display device according to claim 1, wherein the selective reflection member sequentially includes a first dielectric multilayer film and a second dielectric multilayer film,
the first dielectric multilayer film has a reflection central wavelength in a wavelength range of 300 nm to 430 nm, reflects light linearly polarized in a first direction at the reflection central wavelength, transmits light linearly polarized in a second direction orthogonal to the first direction, and transmits at least some of the light in a wavelength range of higher than 430 nm to 650 nm, and
the second dielectric multilayer film has a reflection central wavelength in a wavelength range of 300 nm to 430 nm, reflects light linearly polarized in a second direction at the reflection central wavelength, and transmits at least some of the light in a wavelength range of higher than 430 nm to 650 nm.

4. The liquid crystal display device according to claim 1, wherein the selective reflection member sequentially includes a light reflection layer formed by fixing a first cholesteric liquid crystalline phase and a light reflection layer formed by fixing a second cholesteric liquid crystalline phase,
the light reflection layer formed by fixing the first cholesteric liquid crystalline phase has a reflection central wavelength in a wavelength range of 300 nm to 430 nm, reflects any one of right-circularly-polarized light and left-circularly-polarized light at the reflection central wavelength, transmits the other light, and transmits at least some of the light in a wavelength range of higher than 430 nm to 650 nm, and
the light reflection layer formed by fixing the second cholesteric liquid crystalline phase has a reflection central wavelength in a wavelength range of 300 nm to 430 nm, reflects circularly polarized light in a direction different from that of the light reflection layer formed by fixing the first cholesteric liquid crystalline phase at the reflection central wavelength, and transmits at least some of the light in a wavelength range of higher than 430 nm to 650 nm.

5. The liquid crystal display device according to claim 1, further comprising:
a backlight-side polarizer between the selective reflection member and the liquid crystal cell,
wherein the backlight-side polarizer and the absorption axis of the display-side polarizer are orthogonal to each other.

6. The liquid crystal display device according to claim 5, further comprising:
two polarizing plate protective films on both surfaces of the backlight-side polarizer,
wherein, out of the two polarizing plate protective films, at least the polarizing plate protective film on a selective reflection member side is a cellulose acylate film.

7. The liquid crystal display device according to claim 1, wherein the fluorescent material includes at least a quantum dot.

8. The liquid crystal display device according to claim 7, wherein the quantum dot is a quantum dot having an ellipsoidal shape or a rectangular parallelepiped shape.

9. The liquid crystal display device according to claim 8, wherein a long axis direction of the quantum dot is aligned in a direction parallel to the absorption axis of the display-side polarizer.

10. The liquid crystal display device according to claim 1, wherein the light conversion member is an aligned fluorescent sheet formed by dispersing and then stretching the fluorescent material.

11. The liquid crystal display device according to claim 1, wherein the blue light, the green light, and the red light emitted from the light conversion member all have a peak with a light emission intensity having a half bandwidth of 100 nm or smaller.

12. The liquid crystal display device according to claim 1, wherein the entire backlight unit is a surface light source.

13. The liquid crystal display device according to claim 1, wherein the light emission central wavelength of the unpolarized light emitted from the backlight unit is in a wavelength range of 300 nm to 380 nm.

14. The liquid crystal display device according to claim 1, wherein the unpolarized light emitted from the backlight unit has a peak with a light emission intensity having a half bandwidth of 30 nm or smaller.

15. The liquid crystal display device according to claim 1, wherein the backlight unit includes a reflection member capable of reflecting light in some or all of a wavelength range of 300 nm to 430 nm.

* * * * *